(12) United States Patent
Hasegawa et al.

(10) Patent No.: US 10,574,455 B2
(45) Date of Patent: Feb. 25, 2020

(54) INFORMATION PROCESSING SYSTEM, INFORMATION PROCESSING APPARATUS, METHOD FOR INFORMATION PROCESSING, AND NON-TRANSITORY COMPUTER-READABLE RECORDING MEDIUM HAVING STORED THEREIN INFORMATION PROCESSING PROGRAM

(71) Applicant: TOHOKU UNIVERSITY, Sendai-shi, Miyagi (JP)

(72) Inventors: Shingo Hasegawa, Sendai (JP); Junya Iwazaki, Sendai (JP); Masao Sakai, Sendai (JP); Daiki Takahashi, Sendai (JP); Masayuki Fukumitsu, Sendai (JP)

(73) Assignee: Tohoku University, Sendai-shi, Miyagi (JP)

( * ) Notice: Subject to any disclaimer, the term of this patent is extended or adjusted under 35 U.S.C. 154(b) by 127 days.

(21) Appl. No.: 15/954,011

(22) Filed: Apr. 16, 2018

(65) Prior Publication Data

US 2018/0234239 A1  Aug. 16, 2018

Related U.S. Application Data

(63) Continuation of application No. PCT/JP2016/080351, filed on Oct. 13, 2016.

(30) Foreign Application Priority Data

Oct. 16, 2015 (JP) .................................. 2015-204607

(51) Int. Cl.
*G06F 7/04* (2006.01)
*G06F 15/16* (2006.01)
(Continued)

(52) U.S. Cl.
CPC ............ *H04L 9/0894* (2013.01); *G06F 21/45* (2013.01); *H04L 9/085* (2013.01)

(58) Field of Classification Search
CPC ........ H04L 9/0894; H04L 9/085; G06F 21/45
(Continued)

(56) References Cited

U.S. PATENT DOCUMENTS

| 5,625,692 A | 4/1997 | Herzberg et al. |
| 7,577,689 B1 | 8/2009 | Masinter et al. |

(Continued)

FOREIGN PATENT DOCUMENTS

| JP | 2004-147218 A | 5/2004 |
| JP | 2005-167794 A | 6/2005 |

(Continued)

OTHER PUBLICATIONS

Alexandros G.; Distributed Storage Systems; IEEE p. 1-12; year:2010 (Year: 2010).*

(Continued)

*Primary Examiner* — Monjur Rahim
(74) *Attorney, Agent, or Firm* — Myers Wolin, LLC

(57) ABSTRACT

An information processing system including multiple memory devices and a processor configured to select one node group associated with a time point included in a time period between a current time point and a time point before a predetermined time including the current time point among multiple node groups each associated with one of multiple time points, and store the N pieces of distributed data one to each of N memory devices included in the selected node group. The information processing system carries out a restoring process on at least one of the multiple node groups, and if the restoring results in failure, carries out the restoring process on a second node group associated with a time point (Continued)

before a time point associated with the first node group that causes the failure among the plurality of node groups.

13 Claims, 10 Drawing Sheets

(51) Int. Cl.
  *G06F 17/30* (2006.01)
  *H04L 29/06* (2006.01)
  *H04L 9/08* (2006.01)
  *G06F 21/45* (2013.01)

(58) Field of Classification Search
  USPC .............................................................. 726/6
  See application file for complete search history.

(56) References Cited

U.S. PATENT DOCUMENTS

| | | | | |
|---|---|---|---|---|
| 8,429,369 | B2* | 4/2013 | Ogihara | G06F 11/008 711/114 |
| 9,395,933 | B2* | 7/2016 | Kan | G06F 3/0613 |
| 9,794,341 | B2* | 10/2017 | Manohar | H04W 12/0013 |
| 2008/0256183 | A1* | 10/2008 | Flynn | G06F 3/0688 709/204 |
| 2011/0296195 | A1* | 12/2011 | Nakagawa | G06F 11/2094 713/189 |
| 2014/0006354 | A1* | 1/2014 | Parkison | G06F 3/0611 707/649 |
| 2014/0006357 | A1* | 1/2014 | Davis | G06F 11/1464 707/667 |
| 2014/0006465 | A1* | 1/2014 | Davis | G06F 16/182 707/827 |
| 2014/0007239 | A1* | 1/2014 | Sharpe | G06F 21/561 726/24 |
| 2015/0003809 | A1* | 1/2015 | Matsuda | G11B 27/105 386/248 |
| 2015/0382208 | A1* | 12/2015 | Elliott | G06F 16/245 370/252 |
| 2016/0057226 | A1* | 2/2016 | Bestler | G06F 11/1076 709/217 |

FOREIGN PATENT DOCUMENTS

| | | |
|---|---|---|
| JP | 2007-73004 A | 3/2007 |
| JP | 2013-20314 A | 1/2013 |

OTHER PUBLICATIONS

International Preliminary Report on Patentability issued for corresponding International Patent Application No. PCT/JP2016/080351, dated Apr. 26, 2018, with English translation.
Ganger et al., "Survivable Storage Systems", Proceedings of the DARPA Information Survivability Conference & Exposition II, vol. II, dated Jun. 2001.
International Search Report issued for corresponding International Patent Application No. PCT/JP2016/080351, dated Dec. 20, 2016.
Shamir, "How to share a secret", Communications of the ACM, vol. 22, No. 11, pp. 612-613, Nov. 1979.
Nakamoto, "Bitcoin:A Peer-to-Peer Electronic Cash System", Bitcoin, [online], Year of 2008, retrieved on Oct. 2, 2015, Internet <URL: https://bitcoin.org/bitcoin.pdf>.
King et al., "PPCoin: Peer-to-Peer Crypto-Currency with Proof-of-Stake", [online], Aug. 19, 2012, Internet <URL: https://peercoin.net/assets/paper/peercoin-paper.pdf>.

* cited by examiner

INFORMATION PROCESSING SYSTEM, INFORMATION PROCESSING APPARATUS, METHOD FOR INFORMATION PROCESSING, AND NON-TRANSITORY COMPUTER-READABLE RECORDING MEDIUM HAVING STORED THEREIN INFORMATION PROCESSING PROGRAM

CROSS-REFERENCE TO RELATED APPLICATION

This application is a continuation application of International Application PCT/JP2016/080351 filed on Oct. 13, 2016 and designated the U.S., which claims priority to Japanese Patent Application No. 2015-204607, filed on Oct. 16, 2015. The contents of these applications are incorporated herein by reference.

FIELD OF THE INVENTION

The embodiments discussed herein are related to an information processing system, an information processing apparatus, a method for information processing, and a non-transitory computer-readable recording medium having stored therein an information processing program.

BACKGROUND OF THE INVENTION

An information processing system having multiple memory devices has been known. One kind of such an information processing system disclosed in Patent Document 1 generates N (an integer of two or more) pieces of distributed data from secret data in accordance with the secret sharing scheme, and then stores the N pieces of generated distributed data each into one of N memory devices.

In the above information processing system, even if a user intends to unscrupulously obtain the secret data, for example, the secret data is not successfully restored unless the user obtains k (an integer of two or more and less than N) pieces of distributed data among N pieces of distributed data generated from the secret data. Furthermore, the above information processing system changes the memory devices of the storing destinations to store the N pieces of distributed data in accordance with a predetermined scheme each time when secret data is to be stored.

LIST OF RELATED ART DOCUMENTS

[Patent Document 1] Japanese Laid-open Patent Publication No. 2013-20314

It is conceived that the above information processing stores information to identify the secret data and information to specify the storing destinations of the distributed data in association with each other and, if restoring of the secret data is requested, specifies the storing destinations of the distributed data to be used for restoring the secret data on the basis of the stored information.

However, in this manner, the information may sometimes leak to a user intending to unscrupulously obtain the secret data. Unfortunately, this manner easily specifies the storing destinations of the distributed data to be used for restoring the secret data, so that there is a risk that the secret data is unscrupulously obtained.

In cases where the information processing system does not store information to identify the secret data and information to specify the storing destinations of the distributed data in association with each other, when restoring of the secret data is requested, a process to specify the storing destinations of the distributed data to be used for restoring the secret data intends to be highly loaded.

SUMMARY OF THE INVENTION

According to an aspect of the embodiments, an information processing system includes M (M represents an integer of two or more) memory devices and a processor. The processor is configured to: generate N (N represents an integer of two or more and M or less) pieces of distributed data from secret data in accordance with a secret sharing scheme; select one node group associated with a time point included in a time period between a current time point and a time point before a predetermined time from the current time point among a plurality of node groups each being associated with one of a plurality of time points and each including C (C is an integer of N or more and M or less) memory devices selected from the M memory devices, and store the N pieces of distributed data one to each of N memory devices included in the selected node group; and carry out a restoring process on a first node group among the plurality of node groups. The restoring process includes: requesting at least one of N memory devices included in the first node group for the distributed data; restoring the secret data from a provided data provided in response to the requesting in accordance with the secret sharing scheme; and if the restoring results in failure, carrying out the restoring process on a second node group associated with a time point before a time point associated with the first node group that causes the failure among the plurality of node groups.

According to another aspect of the embodiments, an information processing apparatus is communicably connected to M (M represents an integer of two or more) memory devices. The information processing apparatus includes a processor configured to: generate N (N represents an integer of two or more and M or less) pieces of distributed data from secret data in accordance with a secret sharing scheme; select one node group associated with a time point included in a time period between a current time point and a time point before a predetermined time from the current time point among a plurality of node groups each being associated with one of a plurality of time points and each including C (C is an integer of N or more and M or less) memory devices selected from the M memory devices, and store the N pieces of distributed data one to each of N memory devices included in the selected node group; and carry out a restoring process on a first node group among the plurality of node groups. The restoring process includes: requesting at least one of N memory devices included in the first node group for the distributed data; restoring the secret data from a provided data provided in response to the requesting in accordance with the secret sharing scheme; and if the restoring results in failure, carrying out the restoring process on a second node group associated with a time point before a time point associated with the first node group that causes the failure among the plurality of node groups.

According to an additional aspect of the embodiments, a method for information processing uses M (M represents an integer of two or more) memory devices. The method includes: generating N (N represents an integer of two or more and M or less) pieces of distributed data from secret data in accordance with a secret sharing scheme; selecting one node group associated with a time point included in a time period between a current time point and a time point before a predetermined time from the current time point among a plurality of node groups each being associated with one of a plurality of time points and each including C (C is an integer of N or more and M or less) memory devices selected from the M memory devices, and storing the N pieces of distributed data one to each of N memory devices included in the selected node group; and carrying out a restoring process on a first node group among the plurality of node groups. The restoring process includes: requesting at least one of N memory devices included in the first node group for the distributed data; restoring the secret data provided in response to the requesting in accordance with the secret sharing scheme; and if the restoring results in failure, carrying out the restoring process on a second node group associated with a time point before a time point associated with the first node group that causes the failure among the plurality of node groups.

According to a further aspect of the embodiments, a non-transitory computer-readable recording medium having stored therein an information processing program that causes an information processing apparatus communicably connected to M (M represents an integer of two or more) memory devices to execute a process including: generating N (N represents an integer of two or more and M or less) pieces of distributed data from secret data in accordance with a secret sharing scheme; selecting one node group associated with a time point included in a time period between a current time point and a time point before a predetermined time from the current time point among a plurality of node groups each being associated with one of a plurality of time points and each including C (C is an integer of N or more and M or less) memory devices selected from the M memory devices, and storing the N pieces of distributed data one to each of N memory devices included in the selected node group; and carrying out a restoring process on a first node group among the plurality of node groups. The restoring process includes: requesting at least one of N memory devices included in the first node group for the distributed data; restoring the secret data provided in response to the requesting in accordance with the secret sharing scheme; and if the restoring results in failure, carrying out the restoring process on a second node group associated with a time point before a time point associated with the first node group that causes the failure among the plurality of node groups.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, description will now be made in relation to an information processing system, an information processing apparatus, a method for information processing, and a non-transitory computer-readable recording medium having stored therein an information processing program according to embodiments of the present invention with reference to FIGS. 1-10.

First Embodiment (Configuration)

Figure 1:
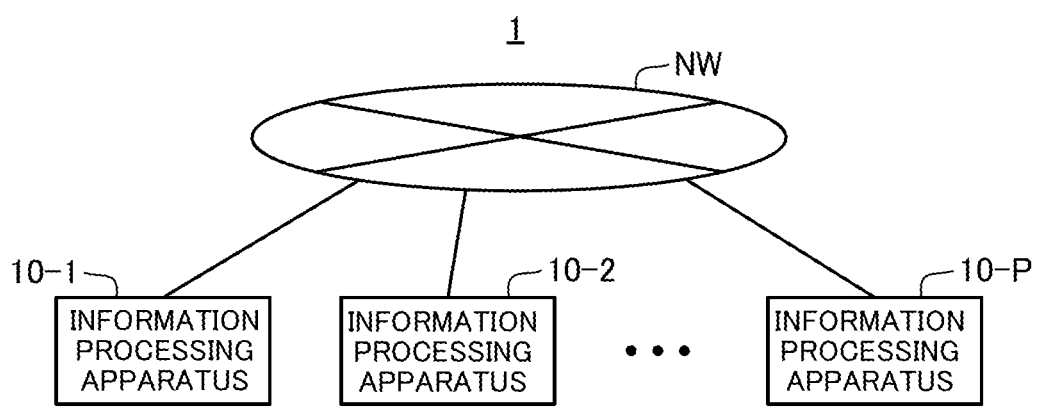
FIG. 1 is a block diagram illustrating the configuration of an information processing system according to a first embodiment.

As illustrated in FIG. 1, an information processing system 1 of the first embodiment includes P (P is an integer of three or more) information processing apparatuses 10-1, . . . , 10-P communicably connected to one another via a communication network NW. The communication network NW of the present embodiment is an Internet Protocol (IP) network. Hereinafter, when there is no need to discriminate the information processing apparatuses 10-p from one another, the information processing apparatus 10 may be represented by a reference number 10. The symbol p represents each integer of from one to P. In this embodiment, the information processing system 1 carries out communication in conformity with a Peer 2 Peer (P2P) scheme. The information processing apparatus 10-p may also be referred to as a node 10-p.

Figure 2:
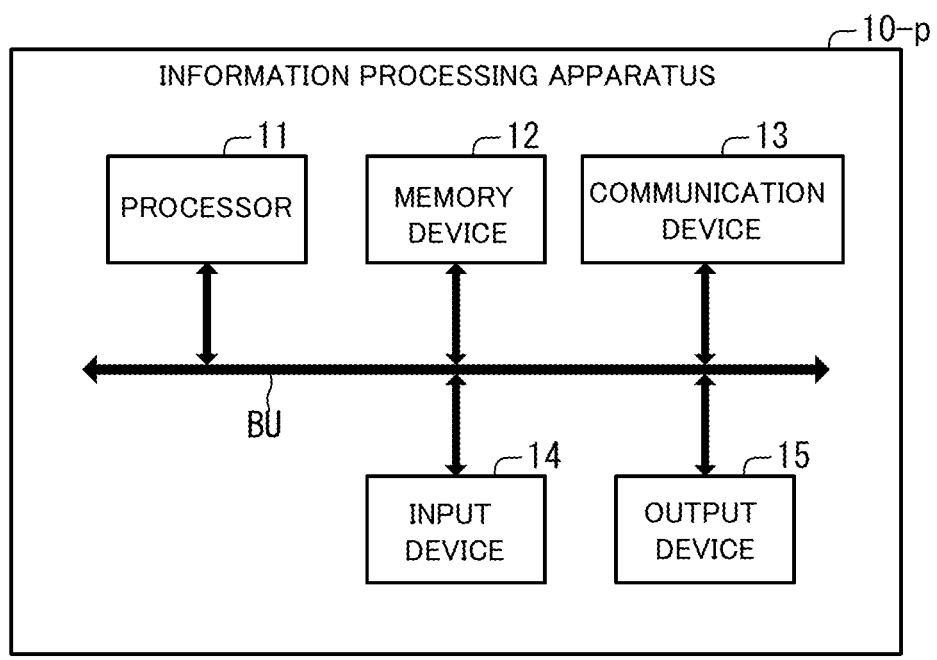
FIG. 2 is a block diagram illustrating the configuration of the information processing apparatus of FIG. 1.

As illustrated in FIG. 2, the information processing apparatus 10-p includes a processor 11, a memory device 12, a communication device 13, an input device 14, and an output device 15 that are connected to one another via a bus BU.

The processor 11 controls the elements constituting the information processing apparatus 10-p by executing a program stored in the memory device 12, and thereby achieves the following function. The processor 11 of the present embodiment includes a Central Processing Unit (CPU). Alternatively, the processor 11 may include a Micro Processing Unit (MPU), or a Digital Signal Processor (DSP).

The memory device 12 readably and writably stores information. For example, the memory device 12 includes at least one of a Random Access Memory (RAM), a Hard Disk Drive (HDD), a Solid State Drive (SSD), a semiconductor memory, and an organic memory. Alternatively, the memory device 12 may include a recording medium, such as flexible disk, an optical disk, a magneto-optical disk, and a semiconductor memory, and a reader that can read information from such a recording medium.

The communication device 13 wiredly or wirelessly communicates with another information processing apparatus 10-q. The symbol q represents integers of from one to P different from p. The communication device 13 of the present embodiment carries out anonymous communication, in which at least one of the sender and the receiver is concealed, with another information processing apparatus 10-q. For example, the anonymous communication may be accomplished by using a technique called "The Onion Router (Tor)" and the "Invisible Internet Project (I2P)".

The communication device 13 may carry out, as at least part of the communication with another 10-q, non-anonymous communication. Non-anonymous communication is communication in which both the sender and the receiver are disclosed.

The input device 14 inputs information from the outside of the information processing apparatus 10-p. In the present embodiment, the input device 14 includes a keyboard and a mouse. Furthermore, the input device 14 may include a microphone and/or a camera.

The output device 15 outputs information to the outside of the information processing apparatus 10-p. In the present embodiment, the output device 15 includes a display. The output device 15 may further include a speaker.

The information processing apparatus 10-p may include a display of a touch panel serving as both the input device 14 and the output device 15.

(Function)

Figure 3:
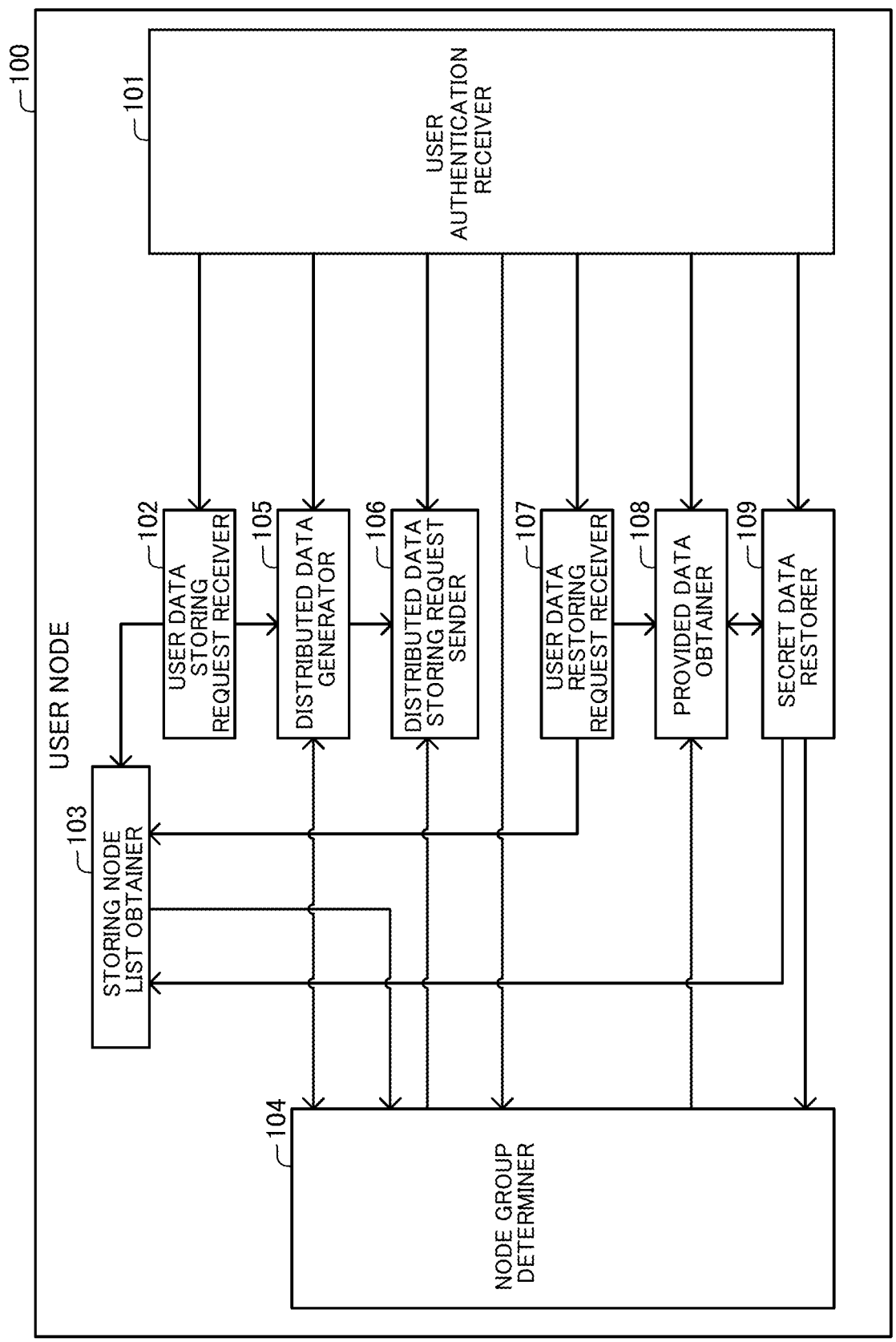
FIG. 3 is a block diagram illustrating the function of the information processing apparatus of FIG. 1 as a user node.
Figure 4:
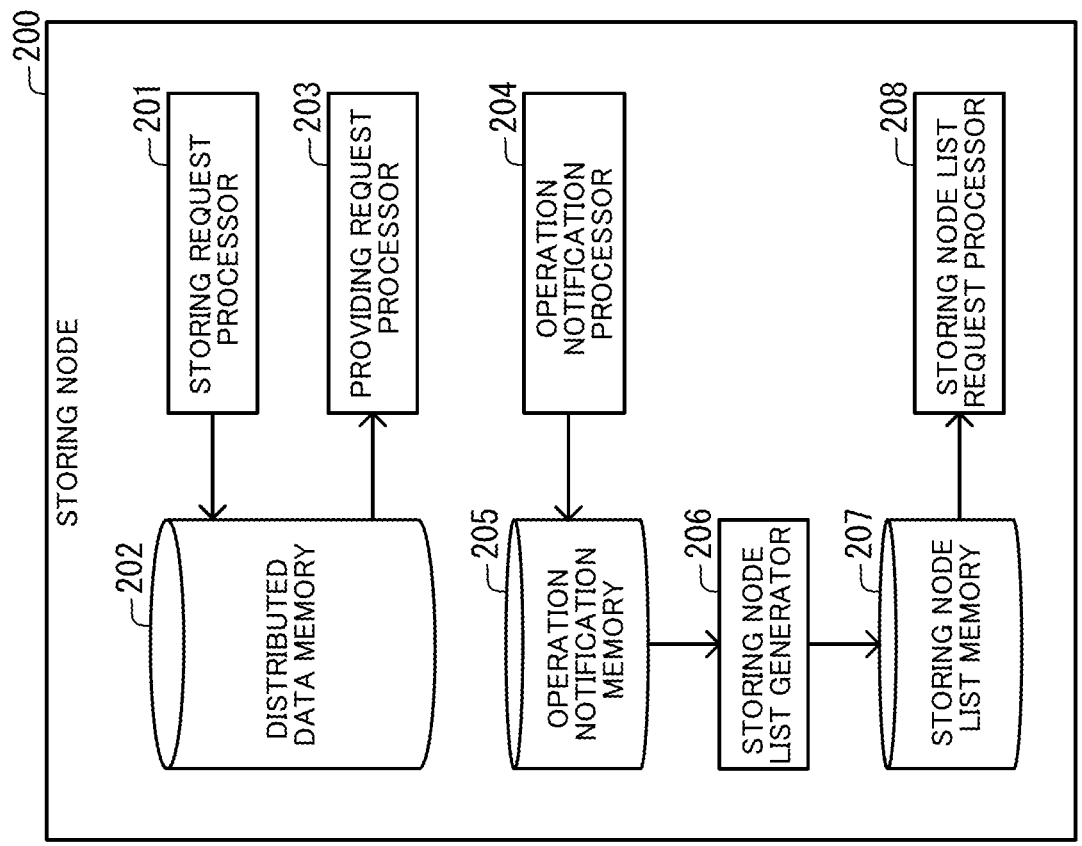
FIG. 4 is a block diagram illustrating the function of the information processing apparatus of FIG. 1 as a storing node.

As illustrated in FIGS. 3 and 4, the information processing apparatus 10-p has a function as a user node 100 and a function as a storing node 200.

In the present embodiment, the information processing apparatus 10-p operates in a mode selected from a first state, a second state, and a third state. The first state causes the information processing apparatus 10-p to function as a user node 100 but not to function as a storing node 200. The second state causes the information processing apparatus 10-p to function as a storing node 200 but not to function as a user node 100. The third state causes the information processing apparatus 10-p to function as both a user node 100 and a storing node 200.

The information processing apparatus 10-p functioning as a user node 100 may be referred to as a user node 100, and the information processing apparatus 10-p functioning as a storing node 200 may be referred to as a storing node 200.

Among the P information processing apparatuses 10-1, . . . , 10-P, some information processing apparatuses 10 may include one of the function as the user node 100 and the function as the storing node 200.

(Function as a User Node)

As illustrated in FIG. 3, the function of a user node 100 includes a user authentication receiver 101, a user data storing request receiver 102, a storing node list obtainer 103, a node group determiner 104, a distributed data generator 105, a distributed data storing request sender 106, a user data restoring request receiver 107, a provided data obtainer 108, and a secret data restorer 109.

In the present embodiment, the distributed data generator 105 serves as generating unit the user data storing request receiver 102, the storing node list obtainer 103, the node group determiner 104, the distributed data storing request sender 106 serve as storing unit; and the storing node list obtainer 103, the node group determiner 104, the user data restoring request receiver 107, the provided data obtainer 108, and the secret data restorer 109 serve as restoring unit.

The user authentication receiver 101 receives user authentication information. In the present embodiment, the user authentication receiver 101 receives, as user authentication information, input information that the user of the information processing apparatus 10-p inputs via the input device 14. In the present embodiment, the input information includes a user identifier (user ID) that specifies the user and a letter string used as a password to authenticate the user.

The user data storing request receiver 102 receives a user data storing request that the user inputs via the input device 14.

The user data storing request input from the user can be considered to be associated with the input information input from the user. A user data storing request includes user data and represents a request for storing the user data.

The user data storing request receiver 102 encrypts the user data included in the received user data storing request. Alternatively, the user data storing request receiver 102 does not have to encrypt the user data.

When the user data storing request is received, the storing node list obtainer 103 obtains a storing node list. The storing node list is information representing the storing nodes 200 among the P information processing apparatuses 10-1, . . . , 10-P and the ranks applied to the storing nodes 200 among the P information processing apparatuses 10-1, . . . , 10-P. In other words, the storing node list is information representing the memory devices 12 included in the storing nodes 200 among the P information processing apparatuses 10-1, . . . , 10-P and the ranks applied to the memory devices 12 included in the storing nodes 200 among the P information processing apparatuses 10-1, . . . , 10-P.

In the present embodiment, the storing node list is information in which the node identifiers (i.e., the node IDs) that specify the storing nodes 200 are arranged in such an order that the ranks come to be lower from the top to the bottom of the list. In the present embodiment, the storing node list constitutes device rank information.

As to be detailed below, the storing node list is generated each time a time point of generating a list comes. In other words, the time point of generating a list is a time point at which the storing node list is generated. In the present embodiment, the point of generating a list is previously determined by the information processing system 1. In other words, the P information processing apparatuses 10-1, . . . , 10-P share the time point of generating a list. In the present embodiment, the time point of generating a list comes each time a predetermined variation time (e.g., one minute) elapses from a reference time point (e.g., 00:00:00, Jan. 1, 2015). The variation time may fluctuate.

As to be detailed below, at least one storing node 200 retains multiple different storing node lists generated at multiple time points of generating a list each in association with corresponding one of the multiple time points of generating a list. For example, a storing node list contains time point information representing the time point of generating a list at which time point the same storing node list is generated.

In the present embodiment, a storing node list is obtained in the following manner. The storing node list obtainer 103 obtains the current time point when a user data storing request is received. Then the storing node list obtainer 103 selects one time point of generating a list from at least one time point of generating a list within a predetermined selecting time period among the time points of generating a list determined in the information processing system 1 in advance. In the present embodiment, the selecting time period is a time period between the obtained current time point and a time point before a predetermined time (e.g., five minutes) from the current time point.

Specifically, the storing node list obtainer 103 randomly selects one time point of generating a list from at least one time point of generating a list within a predetermined selecting time period. In the present embodiment, the random selection uses pseudo-random numbers.

The storing node list obtainer 103 transmits a storing node list request including the time point information representing the selected time point of generating a list to the storing node 200 that retains the storing node list. A storing node list request represents a request for a storing node list. The storing node list obtainer 103 receives (in other words obtains) the storing node list that the storing node 200 transmits in response to the storing node list request. Thereby, the storing node list is successfully obtained.

The distributed data generator 105 generates S pieces of distributed data from secret data, which is user data encrypted by the user data storing request receiver 102, in accordance with the secret sharing scheme. Here, the symbol S represents an integer of two or more and M or less. The symbol M represents the value (P-1) obtained by subtracting one from P, but alternatively may be a value equal to M. The S pieces of distributed data generated from the user data constitute a first distributed data group. Each piece of distributed data may be referred to as a share.

The secret sharing scheme used in the present embodiment is Shamir's secret sharing scheme described in the following Non-Patent Document 1. Alternatively, a different secret sharing scheme from Shamir's secret sharing scheme may be applied. In the present embodiment, the secret sharing scheme applied to user data can restore the secret data from t or more pieces of the distributed data among the S pieces of the distributed data, but does not restore the secret data from pieces of the distributed data less than t pieces of the distributed data among the S pieces of the distributed data. The symbol t represents an integer of two or more and S or less.

Non-Patent Document 1: A. Shamir, "How to share a secret", Communications of the ACM, vol. 22, No. 11, pp. 612-613, 1979

The node group determiner 104 determines a node group for the first distributed data group generated from the user data on the basis of the storing node list obtained by the storing node list obtainer 103 when the user data storing request is received. The node group for the first distributed data group consists of S storing nodes 200.

In the present embodiment, the node group for the first distributed data group is determined in the following manner. The node group determiner 104 randomly selects S node IDs from among the node IDs listed in the storing node list obtained by the storing node list obtainer 103 when the user data storing request is received. The node group determiner 104 determines a node group consisting of S storing nodes 200 specified by the selected S node IDs to be the node group for the first distributed data group to thereby determine the node group for the first distributed data group.

The distributed data storing request sender 106 transmits S first distributed data storing requests to the S storing nodes 200 included in the node group for the first distributed data group which node group is determined by the node group determiner 104 when the user data storing request is received. The S first distributed data storing requests each include one of the S pieces of distributed data constituting the first distributed data group generated by the distributed data generator 105. Each first distributed data storing request further includes a first data identifier (i.e., first data ID) that specifies the corresponding piece of distributed data in a storing node 200 being the storing destination and represents that the corresponding piece of distributed data is requested to be stored in the memory device 12.

In cases where the 106 transmits a first distributed data storing request, the node group determiner 104 further generates metadata. The metadata includes information representing S storing nodes 200 (i.e., the storing destinations) each storing one of the S pieces of distributed data generated from the user data. In the present embodiment, the metadata further includes information to be used for decrypting the encrypted user data and the first data ID.

The node group determiner 104 encrypts the generated metadata. Specifically, the node group determiner 104 obtains a Hash value returned by a predetermined Hash function on the input information associated with the user data storing request on which the metadata is based, and then encrypts the metadata using the obtained hash value in accordance with a predetermined encryption scheme. Examples of the Hash function are MD5, SHA-0, SHA-1, SHA-2, and SHA-3. An example of the encryption scheme is a common-key encryption scheme such as 3-key Triple Data Encryption Algorithm (DES), Advanced Encryption Standard (AES), and Camellia. Alternatively, the node group determiner 104 does not have to encrypt the metadata.

The distributed data generator 105 generates N pieces of distributed data from the secret data, which is the metadata encrypted by the node group determiner 104, in accordance with the secret sharing scheme. The symbol N represents an integer of two or more and M or less, and may be or the same as or different from the value represented by S. The N pieces of distributed data generated from the metadata constitute a second distributed data group.

In the present embodiment, the secret sharing scheme applied to metadata can restore the secret data from k or more pieces of the distributed data among the N pieces of the distributed data, but does not restore the secret data from pieces of the distributed data less than k pieces of distributed data among the N pieces of distributed data. The symbol k is an integer of two or more and less than N.

The node group determiner 104 determines a node group for the second distributed data group generated from the metadata on the basis of the storing node list obtained by the storing node list obtainer 103 when the user data storing request is received. The node group for the second distributed data group consists of N storing nodes 200.

In the present embodiment, the node group for the second distributed data group is determined in the following manner. The node group determiner 104 selects N node IDs from among the node IDs listed in the storing node list on the basis of the storing node list obtained by the storing node list obtainer 103 when the user data storing request is received, a predetermined information rank relationship between the input information and N different ranks, and the input information associated with the user data storing request.

Specifically, the node group determiner 104 obtains N different ranks on the basis of the input information associated with the user data storing request, and the information rank relationship, and selects N node IDs associated with the respective N obtained ranks from among the node IDs listed in the storing node list.

In the present embodiment, the n-th rank in the N ranks of the information rank relationship is defined to be equal to the value of the sum of one and the remainder of the division of the hash value by the number of storing nodes 200 listed in the storing node list, the hash value being returned by a predetermined hash function which returns an integer hash value on information obtained by adding information representing the symbol n which represents the n-th Rank in the N ranks to the input information. The symbol n is integers of from one to N.

In addition to the above, the node group determiner 104 determines the node group consisting of N storing nodes 200 identified by the N selected node IDs to be the node group for the second distributed data group. Thereby, the node group for the second distributed data is determined.

In the present embodiment, a node group corresponds to a device group consisting of N memory devices 12 that N storing nodes 200 included in the node group include.

In the present embodiment, the node group for the second distributed data group which node group is determined by the node group determiner 104 does not vary unless the storing node list and the input information are changed. Accordingly, the selection for storing node list corresponds to selection for a node group for the second distributed data group.

In the present embodiment, the storing node list to be used for determining the node group for the second distributed data group is a storing node list associated with a time point of generating a list represented by the time point information included in the storing node list request. Accordingly, in the present embodiment, selection for a time point of generating a list represented by the time point information included in the storing node list request corresponds to the selection for the node group for the second distributed data group.

The distributed data storing request sender 106 transmits N second distributed data storing requests each to one of N storing nodes 200 being included in the node group for the second distributed data group and being determined by the node group determiner 104 when the user data storing request is received.

The N second distributed data storing requests each includes one of the N pieces of the distributed data constituting of the second distributed data group generated by the distributed data generator 105. Furthermore, each second distributed data storing request includes a second data identifier (i.e., the second data ID) that specifies the distributed data in the storing node 200 of the storing destination and represents requesting for storing the distributed data into the corresponding memory device 12. In the present embodiment, the second data ID is a user ID included in the input information associated with the user data storing request on which the second distributed data is based.

The user data restoring request receiver 107 receives a user data restoring request that the user inputs via the input device 14.

The user data restoring request input from the user can be considered to be associated with the input information input from the user. A user data restoring request represents a request for restoring the user data.

When the user data restoring request is received, the storing node list obtainer 103 obtains a storing node list. In the present embodiment, a storing node list is obtained in the following manner. The storing node list obtainer 103 obtains the current time point when the user data storing request is received. Then the storing node list obtainer 103 selects a time point of generating a list the closest to the obtained current time point from among the time points of generating a list determined in the information processing system 1 in advance.

The storing node list obtainer 103 transmits a storing node list request including a time point information representing the selected time point of generating a list to the storing node 200 that retains the storing node list. The storing node list obtainer 103 receives (in other words, obtains) the storing node list that the storing node 200 transmits in response to the storing node list request. Thereby, the storing node list is obtained.

The node group determiner 104 determines a node group for the second distributed data group generated from the metadata on the basis of the storing node list obtained by the storing node list obtainer 103 when the user data restoring request is received. The node group for the second distributed data group consists of N storing nodes 200.

In the present embodiment, the node group for the second distributed data group is determined in the following manner likewise the case where the user data storing data is received. The node group determiner 104 selects N node IDs from among the node IDs listed in the storing node list obtained in the storing node list obtainer 103 when the user data restoring request is received on the basis of the storing node list, the above information rank relationship, and the input information associated with the user data restoring request.

In addition to the above, the node group determiner 104 determines a node group consisting of N storing nodes 200 identified by the N selected node IDs to be the node group for the second distributed data group. Thereby the node group for the second distributed data group is determined.

The provided data obtainer 108 transmits N second distributed data providing requests to the N storing nodes 200 included in the node group for the second distributed data group which node group is determined by the node group determiner 104 when the user data restoring request is received. Each second distributed data providing request includes the user ID included in the input information associated with the user data restoring request as the second data ID and represents a request for providing the distributed data stored in the corresponding memory device 12.

Alternatively the provided data obtainer 108 may transmit v second distributed data providing request only to v storing nodes 200 among the N storing nodes 200 included in the node group for the second distributed data group determined by the node group determiner 104 when the user data restoring request is received. The symbol v represents an integer less than N and k or more.

The provided data obtainer 108 receives provided data transmitted (i.e., provided) from the storing node 200 in response to the transmitted second distributed data providing request. The pieces of the provided data transmitted in response to the transmitted second distributed data providing requests constitute the second provided data group. Thereby the provided data obtainer 108 obtains the second provided data group. The storing node 200 sometimes does not provide the provided data in response to the second distributed data providing request. Accordingly, the number of pieces of provided data constituting the second provided data group is sometimes less than the number N. The storing node 200 sometimes transmits predetermined dummy data in response to the second distributed data providing request. Accordingly, the second provided data group may include data different from pieces of distributed data constituting the second distributed data group.

The secret data restorer 109 restores the secret data from the distributed data being the pieces of provided data constituting the second provided data group obtained from the provided data obtainer 108 in accordance with the secret sharing scheme.

In cases where the secret data restorer 109 fails in restoring the secret data from the second provided data group, the storing node list obtainer 103 obtains another storing node list. In the present embodiment, a storing node list is obtained in the following manner. If the secret data for the second provided data group fails, the storing node list obtainer 103 obtains a time point of generating a list before the variation time from the time point of generating a list (i.e., the time point when the storing node list which is the cause of the failure is generated) associated with the storing node list of the cause of the failure.

Then the storing node list obtainer 103 transmits the storing node list request including the time point information representing the obtained time point of generating a list to the storing nodes 200 that retains the storing node list. The storing node list obtainer 103 receives (i.e., obtains) the storing nod list that the storing node 200 transmits in response to the storing node list request. Thereby, the storing not list is obtained.

In cases where restoring of the secret data from the second provided data group fails, the node group determiner 104 determines a node group for the second distributed data group generated from the metadata on the basis of the storing node list obtained from the storing node list obtainer 103. In the present embodiment, the node group for the second distributed data group is determined likewise the case where the user data storing request is received.

The provided data obtainer 108 transmits N second distributed data providing requests to the N storing nodes 200 included in the node group for the second distributed data group which node group is determined by the node group determiner 104 when restoring of the secret data from the second provided data group fails. The provided data obtainer 108 receives pieces of the provided data transmitted (i.e., provided) from the storing node 200 in response to the transmitted second distributed data providing requests.

When succeeding in restoring the secret data from the second provided data group, the secret data restorer 109 obtains the hash value returned by the hash function, used in encrypting the metadata, on the input information associated with the user data restoring request. Furthermore, the secret data restorer 109 decrypts the metadata being restored secret data in accordance with the decrypting scheme corresponding to the above encrypting scheme, using the obtained hash value.

When the restoring the secret data from the second provided data group succeeds, the provided data obtainer 108 transmits S first distributed data providing requests one to each of the S storing nodes 200 each storing one of the S pieces of distributed data generated from the user data represented by the metadata decrypted by the secret data restorer 109. Each first distributed data providing request includes a first data ID represented by the metadata decrypted by the secret data restorer 109 and represents a requesting for providing the distributed data stored in the memory device 12.

The provided data obtainer 108 may transmit u first distributed data providing requests only to u storing nodes 200 among the S storing nodes 200 each storing one of the S pieces of distributed data generated from the user data represented by the decrypted metadata. The symbol u represents an integer less than S and t or more.

The provided data obtainer 108 receives pieces of the provided data transmitted (i.e., provided) by the storing nodes 200 in response to the transmitted first distributed data providing requests. The pieces of the provided data received in response to the first distributed data providing requests constitute the first providing data group. Thereby the provided data obtainer 108 obtains the first provided data group. The storing node 200 sometimes does not transmit the providing data in response to the first distributed data providing request. Accordingly, the number of pieces of the provided data constituting the first providing data group is sometimes less than the number S. A storing node 200 sometimes transmits predetermined dummy data in response to the first distributed data providing request. Accordingly, the first providing data group sometimes includes data different from the pieces of distributed data constituting the first distributed data group.

The secret data restorer 109 restores the secret data from the distributed data, which is the provided data constituting the first provided data group obtained by the provided data obtainer 108 in accordance with the secret distribution scheme. When the secret data is successfully restored from the first provided data group, the secret data restorer 109 decrypts the user data being the restored secret data on the basis of information being represented by the decrypted metadata and being used for decrypting the encrypted user data.

(Function: Storing Node)

As illustrated in FIG. 4, the function of a storing node 200 includes a storing request processor 201, a distributed data memory 202, a providing request processor 203, an operation notification processor 204, an operation notification memory 205, a storing node list generator 206, a storing node list memory 207, and a storing node list request processor 208.

The storing request processor 201 receives a first distributed data storing request or a second distributed data storing request from a user node 100.

When the first distributed data storing request is received, the storing request processor 201 stores a first data ID and a piece of distributed data that are included in the first distributed data storing request into the distributed data memory 202 in association with each other. Thereby, the distributed data memory 202 retains the pieces of the distributed data and the first data ID in association with each other.

Likewise, when the second distributed data storing request is received, the storing request processor 201 stores a second data ID and a piece of the distributed data that are included in the second distributed data storing request into the distributed data memory 202 in association with each other. Thereby, the distributed data memory 202 retains the distributed data and the second data ID in association with each other.

The providing request processor 203 receives a first distributed data storing request or a second distributed data storing request from the user node 100.

When the first distributed data providing request is received, the providing request processor 203 transmits a piece of the distributed data that the distributed data memory 202 retains in association with the first data ID included in the same first distributed data providing request to the user node 100 which is the sender of the same first distributed data providing request.

In cases where a piece of the distributed data associated with the first data ID included in the first distributed data providing request is not retained in the distributed data memory 202 when the first distributed data providing request is received, the providing request processor 203 does not transmit data to the user node 100 which is the sender of the same first distributed data providing request. The providing request processor 203 may transmit a notification that the distributed data memory 202 does not retain a piece of the distributed data associated with the first distributed data providing request to the user node 100 which is the sender of the same first distributed data providing request.

Alternatively, the providing request processor 203 may transmit predetermined dummy data to the user node 100 which is the sender of the same first distributed data providing request.

Likewise, when the second distributed data providing request is received, the providing request processor 203 transmits a piece of the distributed data that the distributed data memory 202 retains in association with the second data ID included in the same second distributed data providing request to the user node 100 which is the sender of the same second distributed data providing request.

In cases where a piece of the distributed data associated with the second data ID included in the second distributed data providing request is not retained in the distributed data memory 202 when the second distributed data providing request is received, the providing request processor 203 does not transmit data to the user node 100 which is the sender of the same second distributed data providing request. The providing request processor 203 may transmit a notification that the distributed data memory 202 does not retain a piece of the distributed data associated with the second distributed data providing request to the user node 100 which is the sender of the same second distributed data providing request. Alternatively, the providing request processor 203 may transmit predetermined dummy data to the user node 100 which is the sender of the same second distributed data providing request.

When the information processing apparatus 10-p starts the operation as the storing node 200, the operation notification processor 204 transmits an operation notification to the remaining information processing apparatuses 10-q each time a predetermined notification period elapses and causes the operation notification memory 205 to store the operation notification therein in association with the time point of transmitting the operation notification. The information processing system 1 sets at least one storing node 200 to a list generating node, which generates a storing node list candidate serving as a candidate for a storing node list.

In the present embodiment, a storing node list candidate includes a digital signature of the list generating node that generates the same storing node list candidate. Each list generating node transmits the generated storing node list candidate to the remaining information processing apparatuses 10-q.

Upon receipt of the storing node list candidate, each information processing apparatus 10-q verifies whether the received storing node list candidate is genuine. For example, whether the received storing node list candidate is genuine may be verified using the digital signature included in the storing node list candidate. If the received storing node list candidate is genuine, each information processing apparatus 10-q which receives the storing node list candidate approves the received storing node list candidate.

The information processing system 1 selects one storing node list candidate from among the storing node list candidates generated at the time point of generating a list as a storing node list on the basis of the result of the approvals. For example, the information processing system 1 may select, as the storing node list, a storing node list candidate that is approved by more than the half the total number of information processing apparatuses 10 included in the information processing system 1 the fastest. The storing node list selected by the information processing system 1 may be varied each time the time point of generating a list elapses.

The storing node list is shared by the storing nodes 200 through the transmission and reception among the information processing apparatuses 10. For example, the storing node 200 that receives the storing node list retains the received storing node list. Alternatively, the storing node 200 does not have to always retain the storing node list.

In the present embodiment, the storing node list includes time point information representing the time point of generating a list at which the same storing node list is generated. The storing node list including time point information representing the time point of generating a list at which the same storing node list is generated is an example of the storing node list being associated with the time point of generating a list at which the same storing node list is generated.

The operation notification includes a node ID that identifies the information processing apparatus 10-p and representing that the information processing apparatus 10-p is functioning as a storing node 200. The operation notification may further include time point information representing a time point at which the information processing apparatus 10-p starts the operation as a storing node 200, and may include a digital signature of the information processing apparatus 10-p.

In cases where the information processing apparatus 10-p is set to be a list generating node, the operation notification processor 204 receives an operation notification transmitted from another information processing apparatus 10-q and causes the operation notification memory 205 to store therein the received operation notification in association with the time point of receiving the same operation notification.

Thereby, the operation notification memory 205 retains the operation notification in association with the time point of receiving the same operation notification.

The operation notification memory 205 deletes an operation notification associated with a time point before the above notification period from the current time point among the operation notifications retained therein (in other words, ends to retain the operation notification).

The operation notification retained in the operation notification memory 205 of the storing node 200 may be shared by at least one different storing node 200. At least one of the sharing of an operation notification, the generating of a storing node list candidate, and the sharing of a storing node list may be accomplished by a technique called "block chain" described in the following Non-Patent Literature 2. The selecting of a storing node list from storing node list candidates at each time point of generating a list may be achieved by techniques called "Proof of Work" described in Non-Patent Document 2 and "Proof of Stake" described in Non-Patent Document 3. In cases where an operation notification is shared by multiple storing nodes 200, the sending destination of the operation notification to be transmitted from the operation notification processor 204 may be selected from multiple storing nodes 200 sharing the same operation notification.

Non-Patent Document 2: Satoshi Nakamoto, "Bitcoin:A Peer-to-Perrt Electronic Cash System", Bitcoin, [online], Year of 2008, retrieved on Oct. 2, 2015, Internet <URL: https://bitcoin.org/bitcoin.pdf>

Non-Patent Document 3: Sunny King, Scott Nadal, "PPCoin: Peer-to-Peer Crypto-Currency with Proof-of-Stake", [online], Year of 2012, Internet <URL: https://peercoin.net/assets/paper/peercoin-paper.pdf>

While the information processing apparatus 10-p is set to be a list generating node, the storing node list generator 206 generates a storing node list candidate on the basis of the operation notification retained in the operation notification memory 205 each time the time point of generating a list comes.

While the information processing apparatus 10-p is functioning as a storing node 200, the storing node list memory 207 stores therein the selected storing node list each time the storing node list is selected. As described above, the storing node list of the present embodiment includes time point information representing a time point when the same storing node list is generated. If a storing node list does not include time point information, the storing node list memory 207 may store the storing node list and the generating list time point when the storing node list is generated in association with each other.

In the present embodiment, a storing node list candidate is generated in the following manner such that multiple storing node list candidates generated at respective different time points of generating a list are different from one another.

The storing node list generator 206 provides ranks randomly determined to the storing nodes 200 identified by the node IDs included in the operation notification retained in the operation notification memory 205. In the present invention, the random determination uses pseudo-random numbers. The storing node list generator 206 generates a storing node list candidate being information in which the node IDs included in the operation notification retained in the operation notification memory 205 are arranged in such an order that the provided ranks come to be lower from among the top to the bottom. Thereby, the storing node list candidate is generated.

In the present embodiment, the sending destination of a storing node list request from the storing node list obtainer 103 may be selected from multiple storing nodes 200 that share the storing node list.

The storing node list request processor 208 receives a storing node list request from a user node 100. When the storing node list request is received, the storing node list request processor 208 transmits a storing node list which includes the time point information included in the storing node list request and which is retained in the storing node list memory 207 to the user node 100 being the sender of the same storing node list request.

(Operation)

Next, description will now be made in relation to operation of the information processing system 1.

The present embodiment assumes that the information processing apparatus 10-1 operates in the first state and the information processing apparatuses 10-2, . . . , and 10-P operate in the second state. In other words, the information processing apparatus 10-1 is assumed to function as a user node 100 and the information processing apparatuses 10-2, . . . , and 10-P are assumed to function as storing nodes 200. Furthermore, the present embodiment assumes that each storing node is set to be a list generating node.

In the following description, the information processing apparatus 10-1 may be referred to as the user node 10-1; and likewise the information processing apparatuses 10-2, . . . , and 10-P may be referred to as the storing nodes 10-2, . . . , and 10-P, respectively and also may be referred to as the list generating nodes 10-2, . . . , and 10-P, respectively.

Each of the storing nodes 10-2, . . . , and 10-P transmits an operation notification to the other information processing apparatus 10-q each time the notification period elapses, and causes the memory device 12 to store therein the transmitted operation notification in association with the time point when the operation notification is transmitted.

The storing node 200 receives operation notifications transmitted from the other storing nodes 10-2, . . . , and 10-P and causes the memory device 12 to store therein the received operation notifications in association with the time points when the respective operation notifications are received.

Each of the list generating nodes 10-2, . . . , and 10-P generates a storing node list candidate on the basis of the operation notifications that the list generating nodes 10-2, . . . , and 10-P retain each time the time point of generating a list comes. Each of the list generating nodes 10-2, . . . , 10-P transmits the generated storing node list candidate to the other information processing apparatuses 10-q. The information processing system 1 selects one storing node list candidate from among the storing node list candidates as the storing node list. The storing nodes 200 each cause the corresponding memory device 12 to store therein the selected storing node list.

The user node 10-1 carries out the process of the flow diagram FIG. 5 in the following manner.

Figure 5:
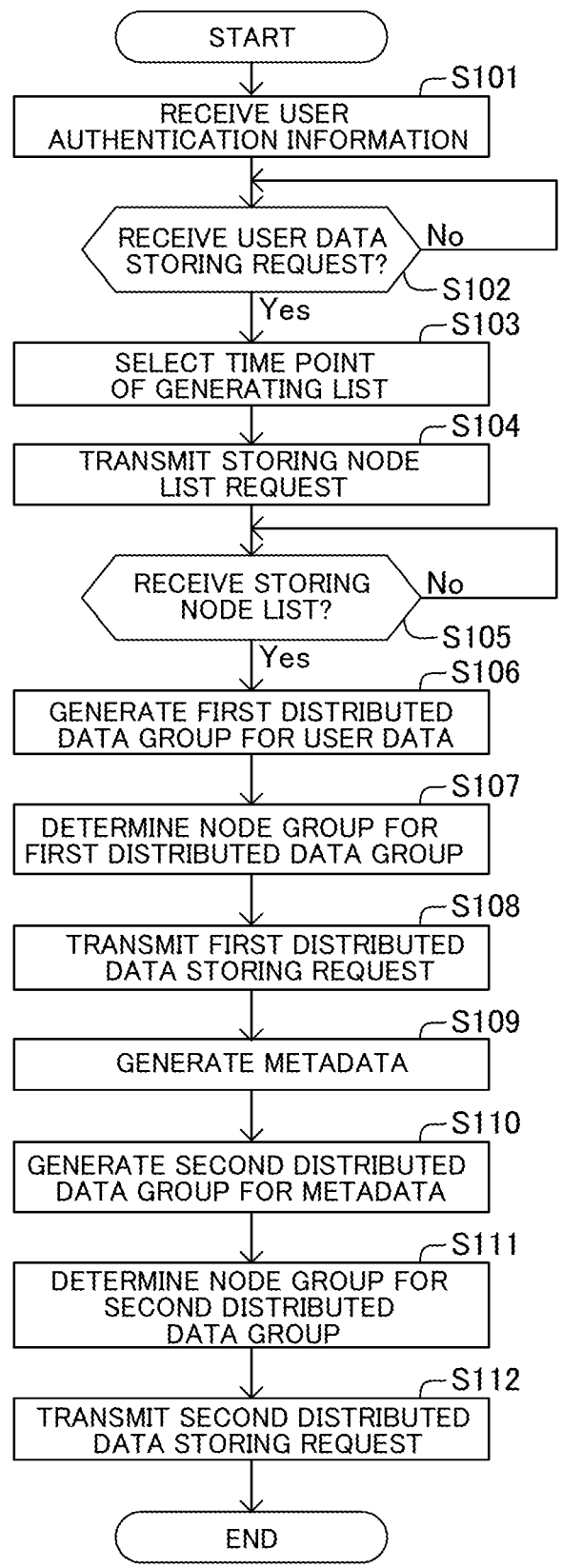
FIG. 5 is a flow diagram illustrating a process that the information processing apparatus of FIG. 1 carries out to store user data.

The user node 10-1 receives the input information as user authentication information (Step S101 of FIG. 5).

Next, the user node 10-1 stands by until receiving a user data storing request ("No" route in Step S102 of FIG. 5).

When the user of the user node 10-1 inputs the user data storing request, the user node 10-1 receives the input user data storing request, and accordingly makes a "Yes" determination and selects a time point of generating a list (Step S103 of FIG. 5).

In the present embodiment, the user node 10-1 obtains the current time point. Furthermore, the user node 10-1 randomly selects one time point of generating a list from at least one time point of generating a list within the above selecting time period among time points of generating a list predetermined in the information processing system 1. As described above, the selecting time period is a time period between the obtained current time and a time period before predetermined time (e.g., five minutes) from the current time.

Then the user node 10-1 transmits a storing node list request including time point information representing the selected time point of generating a list to at least one storing node 200 (Step S104 of FIG. 5). Next, the user node 10-1 stands by until receiving a storing node list from the storing node 200 ("NO" route in Step S105 of FIG. 5).

On the other hand, a storing node 200 receives the storing node list request from the user node 10-1. The storing node 200 transmits a storing node list being retained therein and including the time point information included in the received storing node list request.

Thereby, the user node 10-1 receives at least one storing node list from the storing node 200. The user node 10-1 selects a storing node list free from fraudulence and alter by verifying whether each received storing node list is genuine and retains the selected storing node list. Consequently, the user node 10-1 makes a "Yes" determination and generates a first distributed data group for the user data included in the received user data restoring request (Step S106 in FIG. 5).

In the present embodiment, the user node 10-1 encrypts the user data included in the received user data storing request and generates a first distributed data group consisting of S pieces of the distributed data from the secret data being the encrypted user data in accordance with the secret sharing scheme.

Then, the user node 10-1 determines a node group for the generated first distributed data group based on the storing node list (Step S107 of FIG. 5).

In the present embodiment, the user node 10-1 randomly selects S node IDs from among the node IDs included in the storing node list, and determines a node group consisting of S storing nodes 200 identified the selected S node IDs to be the node group for the first distributed data group.

The user node 10-1 transmits S first distributed data storing requests each to one of the S storing nodes 200 included in the determined node group for the first distributed data group (Step S108 of FIG. 5). The S first distributed data storing requests each include one of the S pieces of the distributed data constituting the generated first distributed data group. Further, each first distributed data storing request includes a first data ID for identify the distributed data in the storing node 200 which stores the distributed data.

Each of the S storing nodes 200 included in the first distributed data group receives a first distributed data storing request from the user node 10-1, and causes the corresponding memory device 12 to store therein a piece of the distributed data and the first data ID that are included in the received first distributed data storing request in association with each other.

After that, the user node 10-1 generates metadata (Step S109 of FIG. 5). The metadata includes information representing the S storing nodes 200 each storing one of the S pieces of distributed data constituting the first distributed data, information to be used for decrypting the encrypted data, and the first data ID.

Next, the user node 10-1 generates the second distributed data group for the generated metadata (step S110 of FIG. 5).

In the present embodiment, the user node 10-1 obtains a Hash value returned by a predetermined hash function on input information received in Step S101 of FIG. 5, and encrypts the metadata in a predetermined encryption scheme using the obtained hash value. Furthermore, the user node 10-1 generates a second distributed data group consisting of N pieces of distributed data from the secret data being the encrypted metadata in accordance with the secret sharing scheme.

Then the user node 10-1 determines a node group for the generated second distributed data group on the basis of the storing node list (Step S111 of FIG. 5).

In the present embodiment, the user node 10-1 selects N node IDs from among node IDs listed in the storing node list retained in Step S105 of FIG. 5 on the basis of the storing node list, the above information rank relationship, and the input information received in Step S101 of FIG. 5, and determines a node group consisting of N storing nodes 200 identified by the selected N node IDs as a node group for second distributed data group.

In succession, the user node 10-1 sends N second distributed data storing requests one to each of the N storing nodes 200 included in the determined node group for the second distributed data group (Step S112 of FIG. 5).

The N distributed data storing requests each include one of the N pieces of distributed data constituting the generated second distributed data group. Each second distributed data storing request further includes a second data ID with reference to which the storing node 200 that is to store the distributed data identifies the distributed data.

Each of the N storing nodes 200 included in the node group for the second distributed data group receives the second distributed data storing request from the user node 10-1, and causes the memory device 12 to store therein a piece of the distributed data and the second data ID that are included in the received second distributed data storing request in association with each other.

Consequently, the user node 10-1 ends the process of FIG. 5.

After that, the user node 10-1 carries out the process of the flow diagram FIG. 6 in the following manner.

Figure 6:
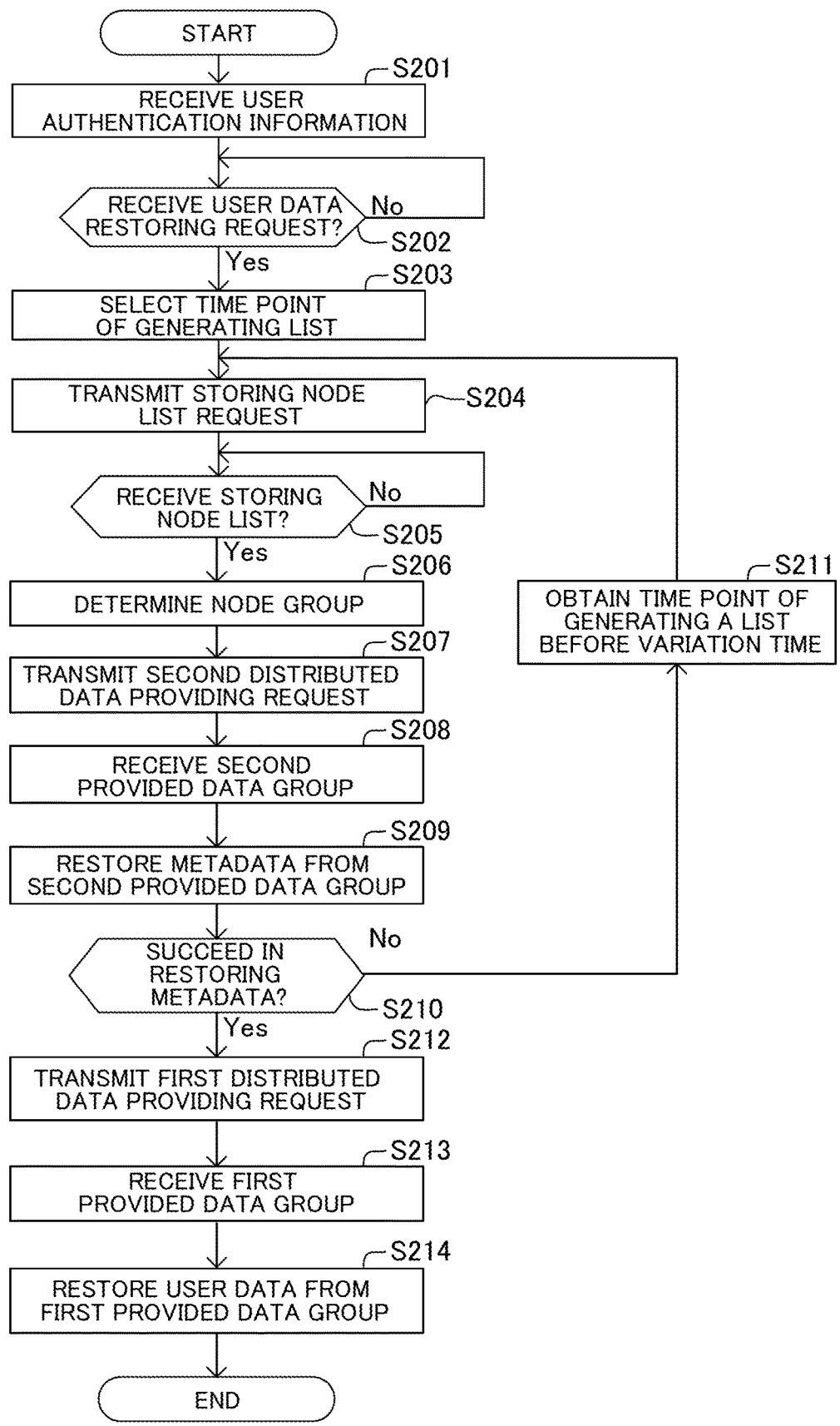
FIG. 6 is a flow diagram illustrating a process that the information processing apparatus of FIG. 1 carries out to restore the user data.

Likewise Step S101 of FIG. 5, the user node 10-1 receives the input information as the user authentication information (Step S201 of FIG. 6).

Next, the user node 10-1 stands by until receiving a user data restoring request ("No" route in Step S202 of FIG. 6).

When the user of the user node 10-1 inputs the user data restoring request, the user node 10-1 receives the input user data restoring request, and accordingly makes a "Yes" determination and selects a time point of generating a list (Step S203 of FIG. 6).

In the present embodiment, the user node 10-1 obtains the current time point, and selects one time point of generating a list closest the obtained current time from among time points of generating a list predetermined in the information processing system 1.

Then the user node 10-1 transmits a storing node list request including time point information representing the selected time point of generating a list to at least one storing node 200 (Step S204 of FIG. 6). Next, the user node 10-1 stands by until receiving a storing node list from a storing node 200 ("NO" route in Step S205 of FIG. 6).

On the other hand, a storing node 200 receives the storing node list request from the user node 10-1. The storing node 200 transmits a storing node list being retained therein and including the time point information included in the received storing node list request.

Thereby, the user node 10-1 receives at least one storing node list from the storing node 200. The user node 10-1 selects a storing node list free from fraudulence and alter by verifying whether each received storing node list is genuine. Consequently, the user node 10-1 makes a "Yes" determination, and likewise Step S111 of FIG. 5, determines the node group for the second distributed data group on the basis of the storing node list (Step S206 of FIG. 6).

In the present embodiment, the user node 10-1 selects N node IDs from among node IDs listed in the storing node list retained in Step S205 of FIG. 6 on the basis of the storing node list, the above information rank relationship, and the input information received in Step S201 of FIG. 5, and determines a node group consisting of N storing nodes 200 identified by the selected N node ID as a node group for second distributed data group.

In succession, the user node 10-1 sends N second distributed data providing requests one to each of the N storing nodes 200 included in the determined node group for the second distributed data group (Step S207 of FIG. 6).

Each second distributed data providing request includes user ID included in the input data received in Step S201 of FIG. 6 as the second data ID.

Each of the N storing nodes 200 included in the node group for the second distributed data group receives a second distributed data providing request from the user node 10-1, and determines whether the distributed data associated with the second data ID included in the received second distributed data providing request is retained in the memory device 12.

If the distributed data is retained in the memory device 12, the storing node 200 included in the node group for the second distributed data group transmits the retained distributed data to the user node 10-1. In contrast, if the distributed data is not retained in the memory device 12, the storing node 200 transmits dummy data to the user node 10-1.

After that, the user node 10-1 receives the provided data that the storing node 200 transmits in response to the second distributed data providing request transmitted in Step S207 of FIG. 6 (Step S208 of FIG. 6). As described above, the provided data received in response to the second distributed data providing request constitute the second provided data group.

Next, the user node 10-1 restores metadata being the secret data from the distributed data being the received provided data constituting the second provided data group in the secrete sharing scheme (Step S209 of FIG. 6).

Then the user node 10-1 determines whether the metadata is successfully restored in Step S209 of FIG. 6 (Step S210 of FIG. 6).

If the restoring of the metadata fails, the user node 10-1 makes a "No" determination and obtains a time point of generating a list before the variation time from the time point of generating a list (i.e., the time point of generating a list associated with the storing node list that causes the failure in restoring the metadata) represented by the time point information included in the latest storing node list request transmitted in Step S204 of FIG. 6 (Step S211 of FIG. 6).

The user node 10-1 transmits a storing node list request including the time point information representing the time point of generating a list obtained in Step S211 of FIG. 6 to at least one storing node 200 (Step S204 of FIG.6). Then the user node 10-1 carries out the process of from steps S205 to S210 of FIG. 6, as described above.

Until the restoring of the metadata succeeds in Step S209 of FIG. 6, the user node 10-1 repeats the process of from Steps S204 to S211 of FIG. 6.

In this embodiment, the processes carried out in Steps S204-S209 may be referred to as a restoring process.

When the restoring of the metadata succeeds in Step S209 of FIG. 6, the user node 10-1 makes a "Yes" determination in Step S210 of FIG. 6, and obtains the hash value returned by the hash function used in the encryption of the metadata on the input information received in Step S201 of FIG. 6. The user node 10-1 decrypts the restored metadata in accordance with a decryption scheme corresponding to the encryption scheme used in the encryption of the metadata, using the obtained hash value.

The user node 10-1 transmits S first distributed data providing requests one to each of the S storing nodes 200 represented by the decrypted metadata (Step S212 of FIG. 6). Each first distributed data providing request includes a first data ID included in the decrypted metadata.

Each of the S storing nodes 200 represented by the decrypted metadata receives the first distributed data providing request from the user node 10-1, and determines whether distributed data associated with the first data ID included in the received first distributed data providing request is retained in the corresponding memory device 12.

If the distributed data is retained in the memory device 12, each of the S storing nodes 200 represented by the decrypted metadata transmits the distributed data to the user node 10-1. If the distributed data is not retained in the memory device 12, the storing node 200 transmits dummy data to the user node 10-1.

After that, the user node 10-1 receives the provided data that the storing node 200 transmits in response to the first distributed data providing request transmitted in Step S212 of FIG. 6 (step S213 of FIG. 6). As described above, the pieces of the provided data received in response to the first distributed data providing requests constitute the first provided data group.

Then the user node 10-1 restores the user data being the secret data from the pieces of the distributed data being the pieces of the received provided data constituting the first provided data group in the secret sharing scheme (Step S214 of FIG. 6). In succession, the user node 10-1 decrypts the restored user data on the basis of information to be used for decrypting the encrypted user data, which information is represented by the decrypted metadata.

Thereby, the user node 10-1 ends the process of FIG. 6.

As detailed above, the information processing system 1 of the first embodiment selects one node group associated with a time point included in a time period between a current time point and a time point before a predetermined time from the current time point among a plurality of node groups each being associated with one of multiple time points. Each node groups includes C (C is an integer of N or more and M or less, in the present embodiment, the symbols C and N are the same value) memory devices 12 selected from the M memory devices. The information processing system 1 further stores the N pieces of generated distributed data one to each of N memory devices included in the selected node group.

Furthermore, the information processing system 1 carries out a restoring process on a first node group among the above multiple node groups. The restoring process includes requesting at least one of N memory devices included in the first node group for the distributed data, and restoring the secret data from a provided data provided in response to the requesting in accordance with the secret sharing scheme. If the restoring results in failure, the information processing system 1 carries out the restoring process on a second node group associated with a time point before a time point associated with the first node group that causes the failure among the plurality of node groups.

This changes the node group to be selected as the passage of the time, and consequently, the memory devices 12 that are to store distributed data therein change as the passage of the time. Accordingly, this can reduce the possibility that the storing destinations of the distributed data to be used for restoring the secret data are specified by the user intending to unscrupulously obtain the secret data. Advantageously, it is possible to inhibited secret data from being unscrupulously obtained.

Further, the information processing system 1 does not store information (in the present embodiment, the second data IDs) that specifies the secret data (in the present embodiment, the metadata) and information that specifies the storing destinations of storing the distributed data in association with each other. Accordingly, this can reduce the possibility that the storing destinations of the distributed data to be used for restoring secret data are specified by the user intending to unscrupulously obtain the secret data. Advantageously, it is possible to inhibited secret data from being unscrupulously obtained.

Besides, if the restoring of the secret data fails, the information processing system 1 carries out the restoring process on the node group associated with a time point before the time point associated with the node group that is a cause of the failure. Accordingly, as compared with the case where the restoring process is carried out on a node group randomly selected when the restoring of the secret data fails, it is possible to enhance the probability of succeeding in restoring the secret data. Consequently, if restoring of secret data is requested, the load on a process to specify the storing destinations of the distributed data used for restoring the secret data can be suppressed.

As a time period until restoring of the secret data is requested since the secret data has been stored is shorter, the number of candidates for a node group used in storing the secret data decreases. Accordingly, it tends to take shorter time required to specify the storing destinations of distributed data that the information processing system 1 uses for restoring the secret data as the time period is shorter. This can enhance the convenience to the user.

The information processing system 1 of the first embodiment receives a storing request in association with the input information input by the user, and in the event of receiving a storing request, sets the multiple node groups on the basis of the input information associated with the storing request. Additionally, the information processing system 1 receives a restoring request in association with the input information input by the user, and in the event of receiving the restoring request, sets the multiple node groups on the basis of the input information associated with the restoring request.

Using the input information common to a case of requesting storing of secret data and a case of restoring of the secret data which information is input by the user, the information processing system 1 sets a node group common to the two cases. Accordingly, the possibility of restoring the secret data, which has been stored in response to a request from the user, in response to a request from another user can be reduced.

Further, the metadata serving as the secret data in the information processing system 1 of the first embodiment is information representing multiple memory devices 12 each store therein one of multiple pieces of distributed data generated from the user data serving as the secret data in accordance with the secret sharing scheme.

This can distribute the storing destinations of storing information to specify the storing destinations of the multiple pieces of distributed data generated from the user data to multiple memory devices 12. Accordingly, a probability of specifying the storing destinations of the multiple pieces of distributed data generated from the user data can be reduced, so that it is possible to inhibit the user data from being unscrupulously obtained.

The metadata may have a predetermined size (e.g., one megabyte, 10 megabyte, or 100 megabyte). In this case, the dummy data that is transmitted in response to the second distributed data providing request preferably has the same size as the metadata. This can prevent the user node 100 from recognizing, on the basis of the size of the provided data received therein in response to the second distributed data providing request, whether the provided data is distributed data or dummy data.

The user data may include multiple data blocks. An example of the data block is a file. In this case, the metadata may include information (e.g., name, time and date of generation, or time and date of updating of the data block) to identify each data block. Further in this case, if the metadata is decrypted, the user node 100 may output a list of the data blocks included in the user data via the output device 15 on the basis of the information included in the decrypted metadata. Besides, in the case, the user node 100 may receive information to identify a data block selected by the user, which information is input from the user of the user node 100 via the input device 14. In this case, the user node 100 may request the storing node 200 for distributed data for the data block identified by the received information.

Alternatively, the information processing system 1 may use the user authentication information as a user data restoring request. In this case, the process of Step S202 of FIG. 6 may be omitted.

<First Modification to First Embodiment>

Next, description will now be made in relation to an information processing system according to a first modification to the first embodiment. The information processing system of the first modification to the first embodiment is different from that of the first embodiment in the point that a node group that is to undergo the restoring process is restricted. Hereinafter, the description focuses on the difference. Like reference number designate the same or the substantially same reference parts and elements between the first embodiment and the first modification to the first embodiment.

In this modification, the user data restoring request includes time period information representing a time period. The time period information includes time points of starting and ending the time period. Alternatively, the time period information includes either one of time points of starting and ending the time period, and the length of the time period.

For example, the user of the user node 100 includes a user data restoring request included time period information representing a time period including a time point when the user data storing request is input.

When the user data restoring request is received, the storing node list obtainer 103 selects the latest time point of generating a list among the time points of generating a list included in the time period represented by the time period information within the same user data restoring request among the time points of generating a list predetermined in the information processing system 1.

If the time period information does not include time point information representing the time point of starting the time period, the storing node list obtainer 103 may use the oldest time point of generating a list among the time points of generating a list associated with the storing node lists retained in the storing node 200 as the time point of starting the time period represented by the time period information. If the time period information does not include time point information representing the time point of ending the time period, the storing node list obtainer 103 may use the latest time point of generating a list among the time points of generating a list associated with the storing node lists retained in the storing node 200 as the time point of ending the time period represented by the time period information.

The storing node list obtainer 103 transmits a storing node list request including the time point information representing a selected time point of generating a list to a storing node 200. The storing node list obtainer 103 receives (i.e., obtains) a storing node list that the storing node 200 transmits in response to the storing node list request.

Further, in the present modification, if the secret data restorer 109 fails in restoring the secret data for the second provided data group, the storing node list obtainer 103 obtains a time point of generating a list before the above variation time from the time point of generating a list (i.e., the storing node list) associated with the storing node list that is the cause of the failure.

Then the storing node list obtainer 103 determines whether the obtained time point of generating a list is within the time period represented by the time period information included in the user data restoring request based on the second providing data group.

If the obtained time point of generating a list is within the time period, the storing node list obtainer 103 transmits a storing node list request including the time point information representing the obtained time point of generating a list to the storing node 200 that retains the storing node list. The storing node list obtainer 103 receives (i.e., obtains) the storing node list that the storing node 200 transmits in response to the storing node list request.

If the obtained time point of generating a list is out of the time period, the storing node list obtainer 103 terminates the process to obtain the storing node list. Thereby the user node 100 terminates the process to obtain the user data. In this case, the user node 100 may output information representing that the process is finished via the output device 15. The information may include information that obtaining of the storing node list fails. The information may include information that obtaining of the user data fails.

As described above, the information processing system 1 of the first modification to the first embodiment brings the same advantages and effects as those of the first embodiment.

Furthermore, the information processing system 1 of the first modification to the first embodiment receives the time period information that is input by the user and that represents a time period. Furthermore, the information processing system 1 restricts a node group that is to undergo the restoring process to node groups associated with the time points within the time period represented by the received time point information among the multiple node groups.

This enhances the possibility of succeeding in restoring the secret data. Consequently, in restoring of the secret data, the load on a process to specify the storing destinations of the distributed data to be used for restoring the secret data can be suppressed. In addition, if the user input a wrong user authentication information, the load on the process to determine that the restoring of the secret data fails can be suppressed.

<Second Modification to First Embodiment>

Next, description will now be made in relation to an information processing system according to a second modification to the first embodiment. The information processing system of the second modification to the first embodiment is different from that of the first embodiment in the point of a scheme to determine a node group for the second distributed data group. Hereinafter, the description focuses on the difference. Like reference number designate the same or the substantially same reference parts and elements between the first embodiment and the second modification to the first embodiment.

In this modification, the node group determiner 104 determines a node group for the second distributed data group in the following manner.

The node group determiner 104 selects an information rank relationship associated with the time point of generating a list associated with the storing node list from among the multiple different information rank relationships associated with the multiple different time points of generating a list.

Each information rank relationship is a predetermined relationship between input information and N different ranks.

In the present embodiment, the n-th rank in the N ranks of the information rank relationship is defined to be equal to the value of the sum of one and the remainder of the division of the hash value by the number of storing nodes 200 listed in the storing node list, the hash value being returned by a predetermined hash function which returns an integer hash value on information obtained by adding information representing the symbol n which represents the n-th Rank in the N ranks and time point information representing the time point of generating a list associated with the information rank relationship to the input information. The symbol n is integers of from one to N.

The node group determiner 104 selects N node IDs from among the node IDs listed in the obtained storing node list on the basis of the storing node list, the selected information rank relationship, and the input information associated with the user data storing request or the user data restoring request.

In addition to the above, the node group determiner 104 determines the node group consisting of N storing nodes 200 identified by the N selected node IDs to be the node group for the second distributed data group. Thereby, the node group for the second distributed data is determined.

As described above, the information processing system 1 of the second modification of the first embodiment brings the same advantages and effects as the information processing system 1 of the first embodiment.

Furthermore, in the information processing system 1 of the second modification to the first embodiment, multiple node groups are set on the basis of multiple different pieces of device rank information (in this example, storing node lists) associated one to each of multiple time points of generating a list and multiple information rank relationships each associated with one of the multiple time points generating a list.

This can further surely change a node group selected as the passage of time. Consequently, this can reduce the possibility that the storing destinations of the distributed data to be used for restoring secret data are specified by the user intending to unscrupulously obtain the secret data. Advantageously, it is possible to inhibited secret data from being unscrupulously obtained.

The storing node list generator 206 may generate a storing node list candidates in the following manner.

The storing node list generator 206 provides ranks to the storing nodes 200 identified by the node IDs included in the operation notification retained in the operation notification memory 205 in such a manner that the node IDs are arranged in accordance with a predetermined algorithm (e.g., an ascending order or a descending order). Then the storing node list generator 206 generates a storing node list candidate being the information in which the node IDs contained in the operation notification retained in the operation notification memory 205 in the descending order, i.e., coming to be lower from the top to the bottom.

In this case, if the operation notification retained in the operation notification memory 205 does not vary, the generated storing node list candidate is not also changed. Accordingly, multiple storing node list candidates generated at multiple different time points of generating a list are sometimes the same. However, in the information processing system 1 of the second modification of to the first embodiment, the information rank relationship used to determine the node group for the second distributed data group changes as the passage of the time. Accordingly, it is possible to change the node group to be selected as the passage of the time.

In this case, the information of multiple storing node lists does not change largely. Accordingly, the information processing system 1 preferably notifies, as the multiple storing node lists, one of the multiple storing node list and the differences between the one storing node lists and each of the remaining storing node lists. This can reduce the communication load to transmit the storing node lists.

<Third Modification to First Embodiment>

Next, description will now be made in relation to an information processing system according to a third modification to the first embodiment. The information processing system of the third modification to the first embodiment is different from that of the first embodiment in the point that a second data ID is different identification information from a user ID. Hereinafter, the description focuses on the difference. Like reference number designate the same or the substantially same reference parts and elements between the first embodiment and the third modification to the first embodiment.

In the present modification, the second data ID included in the second distributed data storing request transmitted from the distributed data storing request sender 106 is a one-time identifier (i.e., one-time ID). In this modification, one-time ID constitutes the identification information. The distributed data storing request sender 106 generates a one-time ID on the basis of the user ID and a password that are included in the input information associated with the user data storing request on which the second distributed data storing request is based and also the time point of generating a list associated with the storing node list used for determining the node group for the second distributed data group.

Specifically, the distributed data storing request sender 106 uses, as the one-time ID, the hash value of information returned by the predetermined hash function, the information being obtained by adding the time point information representing the time point of generating a list to the input information. Examples of the hash function are MD5, SHA-0, SHA-1, SHA-2, and SHA-3.

The second data ID included in the second distributed data providing request that the provided data obtainer 108 transmits is also a one-time ID. Likewise the distributed data storing request sender 106, the provided data obtainer 108 generates a one-time ID on the basis of the user ID and a password that are included in the input information associated with the user data restoring request on which the second distributed data providing request is based and also the time point of generating a list associated with the storing node list used for determining the node group for the second distributed data group.

Likewise the distributed data storing request sender 106, the provided data obtainer 108 uses, as the one-time ID, the hash value returned by the predetermined hash function on the information obtained by adding the time point information representing the time point of generating a list to the input information.

As described above, the information processing system 1 of the third modification to the first embodiment brings the same advantages and effects as those of the first embodiment.

Furthermore, the information processing system 1 of the third modification of the first embodiment generates identification information (in this modification, one-time IDs) on the basis of the time point associated with the selected node group, and stores the N pieces of distributed data in association with the generated identification information.

As compared with a case where the secret data is stored in association with information that identifies the user, for example, this manner can reduce the possibility that the user requests storing of the secret data is specified. Accordingly, the possibility of decrypting the secret data can be reduced if the secret data is encrypted on the basis of the information that specifies the user.

Alternatively, the one-time ID may be the remainder of the division of the hash value returned by the above hash function on the information obtained by adding the time point information representing the time point of generating a list to the input information by a first parameter, which is a positive integer. The first parameter in the present modification is predetermined in the information processing system 1. Using the first parameter can further reduce the possibility that the information on which the one-time ID is based can be specified.

Alternatively, the first parameter may fluctuate. In this alternative, the first parameter may be set to increase as the number of node IDs listed in the storing node list increases. In this case, a first parameter function that defines the relationship between the number of node IDs listed in the storing node list and the first parameter is defined in the information processing system 1 in advance, for example.

<Fourth Modification to First Embodiment>

Next, description will now be made in relation to an information processing system according to a fourth modification to the first embodiment. The information processing system of the fourth modification to the first embodiment is different from that of the first embodiment in the point that the second data ID is different identification information from a user ID. Hereinafter, the description focuses on the difference. Like reference number designate the same or the substantially same reference parts and elements between the first embodiment and the fourth modification to the first embodiment.

In the present modification, the second data ID included in the second distributed data storing request transmitted from the distributed data storing request sender 106 is a one-time identifier (i.e., one-time ID). In this modification, one-time ID constitutes the identification information. The distributed data storing request sender 106 generates, as the one-time ID, information different with each of the N storing node 200 included in the node group for the second distributed data group.

In this modification, the one-time ID for the n-th storing node 200 among the N storing nodes 200 included in the node group of the second distributed data group is a hash value returned by a predetermined hash function on the information obtained by adding the node ID that identifies the r-th storing node 200 among the N storing nodes 200 to the user ID included in the input information associated with the user data storing request on which the second distributed data storing request is based. The symbol "r" represents the number n+1 when the symbol n represents integers of one to N−1, and represents one when the symbol n represents N. Examples of the hash function are MD5, SHA-0, SHA-1, SHA-2, and SHA-3.

The second data ID included in the second distributed data providing request that the provided data obtainer 108 transmits is also a one-time ID. Likewise the distributed data storing request sender 106, the provided data obtainer 108 generates, as one-time ID, information different with each of the N storing nodes 200 included in the node group for the second distributed data group.

Specifically, the provided data obtainer 108 uses, as the one-time ID of the n-th storing node 200 among the N storing nodes 200, a hash value returned by the hash function on the information obtained by adding the node ID that identifies the r-th storing node 200 among the N storing nodes 200 to the user ID included in the input information associated with the user data restoring request on which the second distributed data providing request is based.

As described above, the information processing system 1 of the fourth modification to the first embodiment brings the same advantages and effects as those of the first embodiment.

Furthermore, the information processing system 1 of the fourth modification to the first embodiment generates identification information (in this modification, a one-time IDs)

on the basis of the time point associated with the selected node group, and stores the N pieces of distributed data in association with the generated identification information.

As compared with a case where the secret data is stored in association with information that identifies the user, for example, this manner can reduce the possibility that the user requested storing of the secret data is specified. Accordingly, the possibility of decrypting the secret data can be reduced if the secret data is encrypted on the basis of the information that specifies the user, for example.

Furthermore, the information processing system 1 of the fourth modification to the first embodiment generates, as identification information, information different with each of the N memory devices 12 included in the selected node group.

This can reduce the possibility that the distributed data to be used to restore the secret data is specified on the basis of the identification information.

Alternatively, the one-time ID of the n-th storing node 200 among the N storing nodes 200 may be the remainder of the division of a hash value by a first parameter, which is a positive integer, the hash value being returned by the above hash function on the information obtained by adding the node ID to specify the r-th storing node 200 among the N storing nodes to the user ID included in the input information. The first parameter in the present modification is predetermined in the information processing system 1. Using the first parameter can further reduce the possibility that the information on which the one-time ID is based can be specified.

Alternatively, the first parameter may fluctuate. In this alternative, the first parameter may be set to increase as the number of node IDs listed in the storing node list increases. In this case, a first parameter function that defines the relationship between the number of node IDs listed in the storing node list and the first parameter is defined in the information processing system 1 in advance, for example.

Second Embodiment

Next, description will now be made in relation to an information processing system according to a second embodiment. The information processing system of the second embodiment is different from that of the first embodiment in the point that the time required for restoring secret data varies with the strength of a password used for authentication of the user. Hereinafter, the description focuses on the difference. Like reference number designate the same or the substantially same reference parts and elements between the first embodiment and the second embodiment.

In the present embodiment, the node group determiner 104 determines the node group for the second distributed data group when a user data storing request is received in the following manner.

When the user data storing request is received, the node group determiner 104 determines the candidate number C on the basis of a password included in the input information associated with the received user data storing request. The candidate number C is set to be larger in the range of larger than N and M or less as the password is more easily specified (i.e., the strength of the password is lower).

In the present embodiment, the candidate number C is determined in the following manner. The node group determiner 104 calculates a parameter having a smaller value based on a password as the password is more easily specified.

For example, if the number of letters constituting a password is a predetermined threshold or more, the node group determiner 104 adds a predetermined increment to the parameter. For example, if a password includes a numeral, the node group determiner 104 adds a predetermined increment to the parameter. Further for example, if the password includes a lower-case alphabetic character, the node group determiner 104 adds a predetermined increment to the parameter. Still further for example, if the password includes a capital alphabetic character, the node group determiner 104 adds a predetermined increment to the parameter. For example, if a password includes a signature (e.g., a letter except for numerals or alphabets), the node group determiner 104 adds a predetermined increment to the parameter. For example, if a password does not include a letter string included in the corresponding user ID, the node group determiner 104 adds a predetermined increment to the parameter. For example, if a password does not include a letter string included in a dictionary, the node group determiner 104 adds a predetermined increment to the parameter.

The node group determiner 104 determines the candidate number C in a range of N or more and M or less such that the number C is larger as the calculated parameter is smaller. Thereby, the candidate number C is determined.

The node group determiner 104 selects (i.e., determines) C node IDs among the node IDs listed in the storing node list obtained by the storing node list obtainer 103 when the user data storing request is received on the basis of the storing node list, the predetermined information rank relationship between the determined C ranks and the input information, and the input information associated with the user data storing request. The C storing nodes 200 identified by the C selected node IDs constitute a candidate node group.

Specifically, the node group determiner 104 obtains the C ranks on the basis of the input information associated with the user data storing request and the information rank relationship, and selects the C node IDs corresponding one to each of the obtained C ranks from among the node IDs listed in the storing node list.

In the present embodiment, the c-th rank among the C ranks is defined to be equal to the value of the sum of one and the remainder of the division of the hash value by the number of storing nodes 200 listed in the storing node list, the hash value being returned by a predetermined hash function having an integer hash value on information obtained by adding information representing the symbol c to the input information. The symbol c is integers of from one to C.

Furthermore, the node group determiner 104 randomly selects N nodes IDs from among the selected C node IDs, and also determines a node group consisting of the N storing nodes 200 identified by the N node IDs randomly selected as the node group for the second distributed data group. Thereby the node group for the second distributed data group is determined.

Likewise the case where a user data storing request is received, when a user data restoring request is received, the node group determiner 104 determines the candidate number C on the basis of a password included in the input information associated with the user data restoring request. The relationship between a password and the candidate number C determined by the node group determiner 104 is common to a case where a user data storing request is received and a case where a user data restoring request is received.

Likewise the case where a user data storing request is received, the node group determiner 104 selects (i.e., determines) the determined C node IDs among the node IDs listed in a storing node list on the basis of the storing node list obtained by the storing node list obtainer 103 when the user data restoring request is received, the information rank relationship, and the information associated with the user data restoring request. The storing nodes 200 identified by the selected C node IDs constitute a candidate node group.

In the present embodiment, the provided data obtainer 108 transmits the C second distributed data providing requests one to each of the C storing nodes 200 included in the candidate node group determined by the node group determiner 104 when the user data restoring request is received. The provided data obtainer 108 may transmit v second distributed data providing requests only to one or more storing nodes 200 among the C storing nodes 200 included in the candidate node group determined by the node group determiner 104 when the user data restoring request is received. If the restoring of the secret data fails in this case, the provided data obtainer 108 may transmit the second distributed data providing request to the remaining storing nodes 200 among the C storing nodes 200.

The provided data obtainer 108 receives provided data transmitted (i.e., provided) from the storing node 200 in response to the transmitted second distributed data providing request. The provided data received in response to the transmitted second distributed data providing request constitutes the second provided data group. Thereby the provided data obtainer 108 obtains the second provided data group. The storing node 200 sometimes does not transmit the provided data in response to the second distributed data providing request. Accordingly, the number of pieces of provided data constituting the second provided data group is sometimes less than the number C. The storing node 200 sometimes transmits predetermined dummy data in response to the second distributed data providing request. Accordingly, the second provided data group may include data different from pieces of distributed data constituting the second distributed data group.

The secret data restorer 109 generates all the combinations of N storing nodes 200 selected from the C storing nodes included in the candidate node group determined by the node group determiner 104. Each combination including N storing nodes 200 is a node group candidate. In other words, each node group consists of N storing nodes 200.

The secret data restorer 109 restores the secret data from the distributed data being provided data from N storing nodes 200 included in a node group candidate from among the provided data constituting the second providing data group that the provided data obtainer 108 obtains for each generated node group candidate. As described above, the secret data can be restored from k or more pieces of the distributed data among the N pieces of the distributed data, the secret data restorer 109 may generate all the combinations of k or more storing nodes 200.

Next, description will now be made in relation to an operation in the information processing system 1 of the second embodiment.

Figure 7:
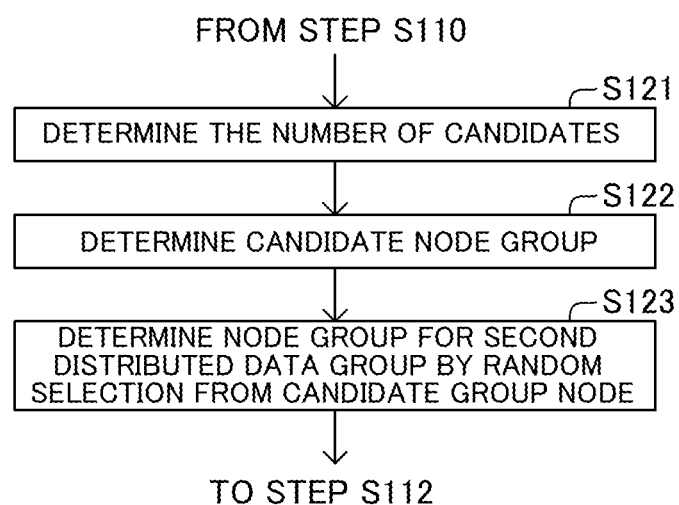
FIG. 7 is a flow diagram illustrating part of a process that an information processing apparatus according to a second embodiment carries out to store user data.

The user node 10-1 executes a process in which the process of step S111 of FIG. 5 is replaced by steps S121-S123 of FIG. 7 as a substitution of the process of FIG. 5.

Specifically, the user node 10-1 carries out the process of Step S110 of FIG. 5, and then determines the candidate number C on the basis of the password included in the input information received in Step S101 of FIG. 5 (Step S121 of FIG. 7).

Next, the user node 10-1 determines a candidate node group for the second distributed data group generated in Step S110 of FIG. 5 on the basis of the storing node list retained in Step S105 of FIG. 5 and the candidate number C determined in Step S212 of FIG. 7 (Step S122 of FIG. 7).

In the present embodiment, the user node 10-1 determines the candidate node group by selecting the C node IDs which number is determined in Step S121 of FIG. 7 among the node IDs listed in the storing node list retained in Step S105 of FIG. 5 on the basis of the same storing node list, the information rank relationship, and the input information received in Step S101 of FIG. 5.

Next, the user node 10-1 randomly selects N storing nodes 200 from the C storing nodes constituting the determined candidate node groups, and determines a node group consisting of the selected N storing node as the node group for the second distributed data group (Step S123 of FIG. 7). Then the user node 10-1 carries out the process of and subsequent to Step S112.

Figure 8:
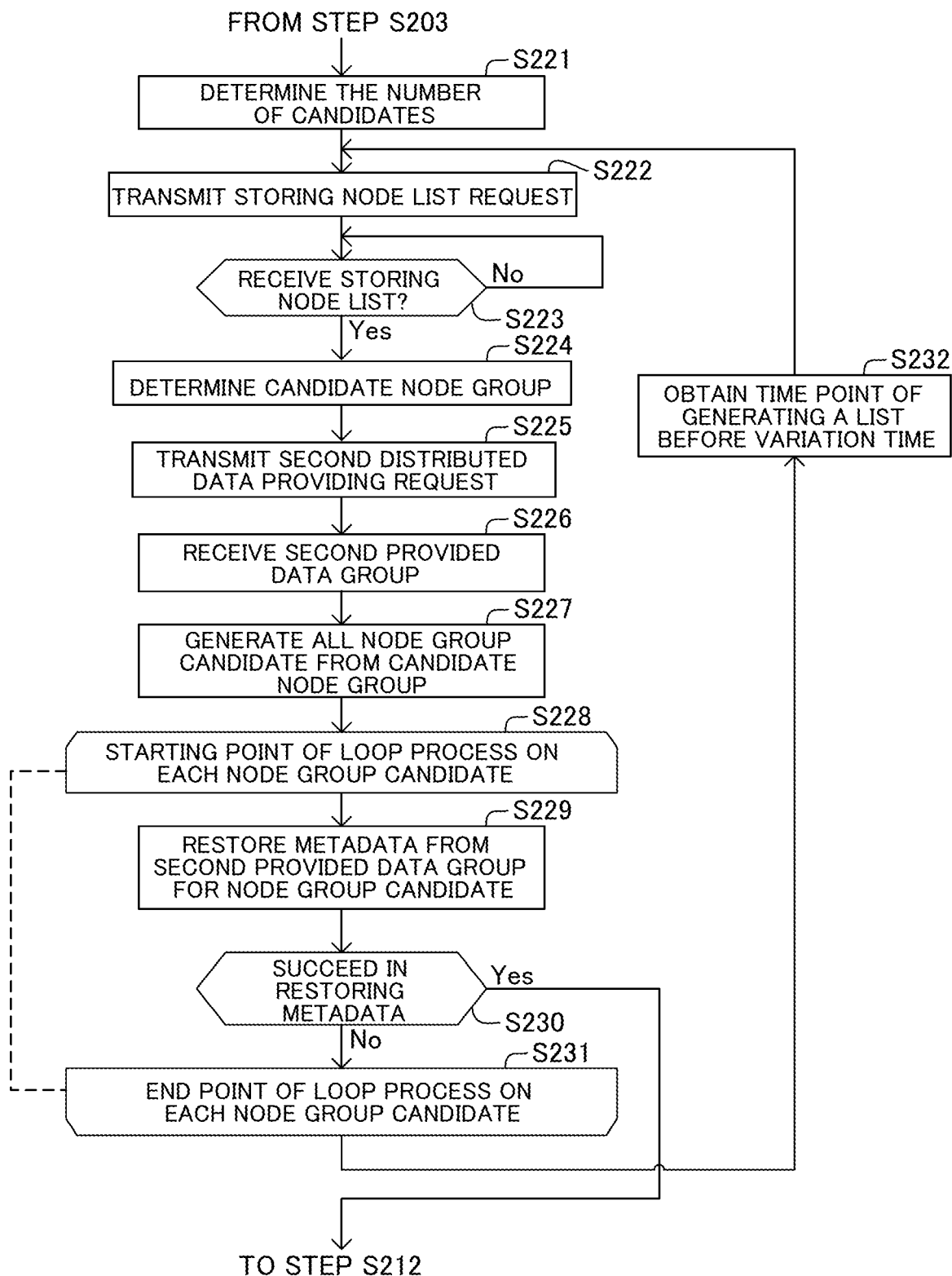
FIG. 8 is a flow diagram illustrating part of a process that an information processing apparatus according to the second embodiment carries out to restore user data.

The user node 10-1 execute a process in which Steps S204-S211 of FIG. 6 are replaced by Steps S221-S232 of FIG. 8 as a substitution of the process of FIG. 6.

Specifically, the user node 10-1 carries out the process of Step S203 of FIG. 6, and then determines the candidate number C on the basis of the password included in the input information received in Step S101 of FIG. 6 (Step S221 of FIG. 8). After that, the user node 10-1 carries out the process of Steps S222 and S223 of FIG. 8 likewise Steps S204 and S205 of FIG. 6.

Next, likewise step S122 of FIG. 7, the user node 10-1 determines a candidate node group for the second distributed data group on the basis of the storing node list retained in Step S223 of FIG. 8 and the candidate number C determined in Step S221 of FIG. 8 (Step S224 of FIG. 8).

In the present embodiment, the user node 10-1 determines the candidate node group by selecting the C node IDs which number is determined in Step S221 of FIG. 8 among the node IDs listed in the storing node list retained in Step S223 of FIG. 8 on the basis of the same storing node list, the information rank relationship, and the input information received in Step S201 of FIG. 6.

Subsequently, the user node 10-1 transmits the C second distributed data providing requests one to each of the C storing nodes 200 included in the determined candidate node group (Step S225 of FIG. 8).

Each of the C storing nodes 200 included in the determined candidate node group receives the second distributed data providing request from the user node 10-1 and then determines whether the distributed data associated with the second data ID included in the received second distributed data providing request is retained in the corresponding memory device 12.

If the distributed data is stored in the corresponding memory device 12, each of the C storing nodes 200 included in the determined candidate node group transmits the distributed data to the user node 10-1. In contrast, if the distributed data is not stored in the corresponding memory device 12, the storing node 200 transmits dummy data to the user node 10-1.

After that, the user node 10-1 receives the provided data that the storing node 200 transmits in response to the second distributed data providing request transmitted in Step S225 of FIG. 8 (Step S226 of FIG. 8). As described above, the provided data received in response to each second distributed data providing request constitutes the second provided data group.

Then the user node 10-1 generates all the combinations of N (k or more) storing nodes 200 selected from the C storing nodes included in the candidate node group determined in Step S224 of FIG. 8 (Step S227 of FIG. 8). As described above, each of the combinations constitutes a node group candidate.

In succession, the user node 10-1 carries out a loop process subsequently on the generated node group candidates. The starting point and the end point of the loop process correspond to Steps S228 and S231 of FIG. 8, respectively. The user node 10-1 carries out multiple loop processes in parallel with one another.

In the loop process, the user node 10-1 restores the metadata being the secret data from the distributed data being the N (k or more) pieces of provided data provided from the N (k or more) storing nodes 200 included in the node group candidate, which is a target of the loop process, among the provided data constituting the second provided data group received in Step S226 of FIG. 8 in accordance with the secret sharing scheme (Step S229 of FIG. 8).

Then, in the loop process, the user node 10-1 determines whether the restoring of the metadata in Step S229 of FIG. 8 succeeded (Step S230 of FIG. 8).

If the storing of the metadata succeeded, the user node 10-1 makes a "Yes" determination and terminates the overall loop process on each of the generated node group candidates and carries out processes of and subsequent to Step S212 of FIG. 6.

If the restoring of the metadata fails, the user node 10-1 makes a "No" determination and proceeds to step S231 of FIG. 8. The user node 10-1 carries out the loop process on each of the generated node group candidates in this manner.

If the metadata is not successfully restored until the loop process on all the generated node group candidates is finished, the user node 10-1 obtains a time point of generating a list before the variation time from the time point of generating a list (i.e., the time point of generating a list associated with the storing node list that cause the failure in restoring of the metadata) represented by time point information included in the latest storing node list request transmitted in Step S222 of FIG. 8 (Step S232 of FIG. 8).

The user node 10-1 transmits a storing node list request including the time point information representing the time point of generating a list obtained in Step S232 of FIG.8 to at least one storing node 200 (Step S222 of FIG. 8). Then the user node 10-1 carries out the above process of from steps S223 to S231 of FIG. 8.

Until the restoring of the metadata succeeds in Step S229 of FIG. 8, the user node 10-1 repeats the process of from Steps S222 to S232 of FIG. 8.

As described above, the information processing system 1 of the second embodiment brings the same advantages and effects as the information processing system 1 of the first embodiment.

Furthermore, the information processing system 1 of the second embodiment sets the number C of memory devices 12 included in a node group (in the present embodiment, a candidate node group) to be larger as the password to be used for authentication of the user is more easily specified.

In addition to the above, the information processing system 1 randomly selects N memory devices 12 from among the C memory devices 12 included in the selected node group (in the present embodiment, the candidate node group), and stores the N pieces of generated distributed data each into one of the N selected memory devices 12. Furthermore, the information processing system 1 requests the C memory devices 12 included in the node group (in the present embodiment, the candidate node group) for the distributed data. Still furthermore, the information processing system 1 restores the secret data from N (k or more) pieces of provided data constituting each of combination including the N (k or more) pieces of provided data selected from the C pieces of provided data provided in response to the request in accordance with the secret sharing scheme.

With this configuration, the number C of memory devices 12 included in a node group (in the present embodiment, a candidate node group) is set to be larger as the password to be used for authentication of the user is more easily specified. Consequently, as the password to be used for authentication of the user is more easily specified, the restoring of the secret data more easily fails. For the above, as the password to be used for authentication of the user is more easily specified, it takes a longer time to specify the storing destinations of pieces of the distributed data to be used for restoring the secret data. This can motivate the user to set a password less easily specified for authentication of the user. If the password to be used for authentication of the user is easily specified, this configuration makes it possible to increase load on the process to specify the storing destinations of pieces of distributed data to be used for restoring the secret data if another user intends to unscrupulously obtain the secret data of the user. This can inhibit the secret data of the user from being unsupulously obtained.

Third Embodiment

Next, description will now be made in relation to an information processing system according to a third embodiment. The information processing system of the third embodiment is different from that of the first embodiment in the point that when a predetermined condition is satisfied, providing of the provided data to the user data is prohibited. Hereinafter, the description focuses on the difference. Like reference number designate the same or the substantially same reference parts and elements between the first embodiment and the third embodiment.

In the present embodiment, the user node 100 transmits the second distributed data providing request by means of communication in which the sender is disclosed. Alternatively, the second distributed data providing request may be transmitted via non-anonymous communication using, for example, a technique called Transport Layer Security (TLS).

In the present invention, the second data ID included in the second distributed data storing request that the distributed data storing request sender 106 transmits includes a one-time ID and generating time point information representing the time point of generating a list. The generating time point information represents a time point of generating a list associated with the storing node list used for determining the node group for the second distributed data group. Alternatively, the second data ID may include the user ID in place of the one-time ID or may include the input information in place of the one-time ID.

In the present embodiment, the generating time point information constitute time point specification information that specifies a time point.

The distributed data storing request sender 106 generates a one-time ID on the basis of the user ID and a password that are included in the input information associated with the user data storing request on which the second distributed data storing request is based and also generating time point information representing the time point of generating a list associated with the storing node list used for determining the node group for the second distributed data group. In the present embodiment, a one-time ID constitutes generating information generated on the basis of the input information.

Specifically, the distributed data storing request sender 106 uses, as the one-time ID, the hash value returned by the predetermined hash function on the information obtained by adding the generating time point information representing the time point of generating a list to the input information. Examples of the hash function are MD5, SHA-0, SHA-1, SHA-2, and SHA-3.

The second data ID included in the second distributed data providing request that the provided data obtainer 108 transmits also includes a one-time ID and the generating time point information representing the time point of generating a list. The generating time point information represents the time point of generating a list associated with the storing node list used to determine the node group for the second distributed data group. Likewise the distributed data storing request sender 106, the provided data obtainer 108 generates a one-time ID on the basis of the user ID and a password that are included in the input information associated with the user data restoring request on which the second distributed data providing request is based and also the generating time point information representing the time point of generating a list associated with the storing node list used for determining the node group for the second distributed data group.

Likewise the distributed data storing request sender 106, the provided data obtainer 108 uses, as the one-time ID, the hash value of the predetermined hash function on the information obtained by adding the generating time point information representing the time point of generating a list to the input information.

Figure 9:
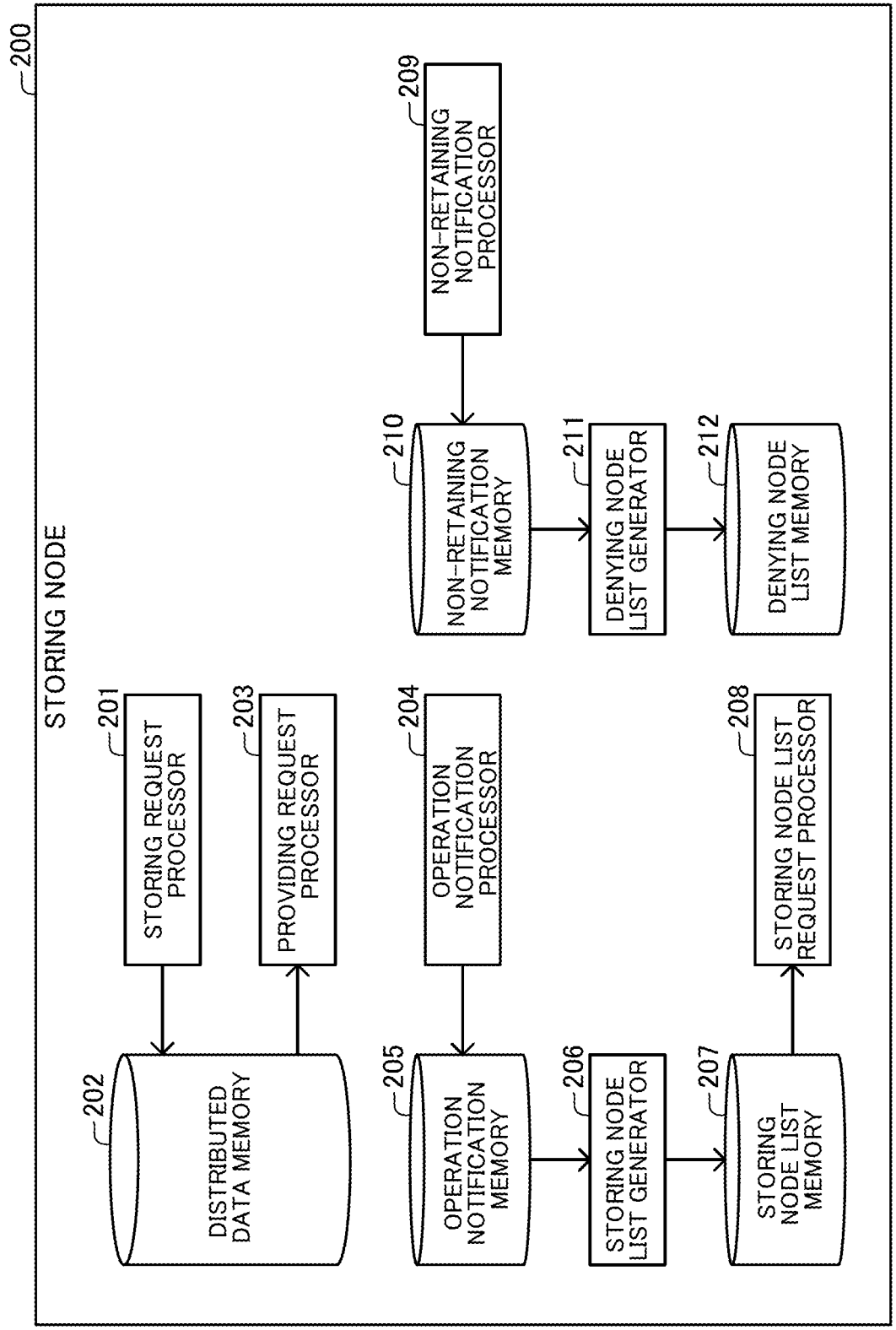
FIG. 9 is a block diagram illustrating the function of an information processing apparatus according to a third embodiment as a storing node.

As illustrated in FIG. 9, the storing node 200 has functions as a non-retaining notification processor 209, a non-retaining notification memory 210, a denying node list generator 211, and a denying node list memory 212 in addition to the functions of the storing node 200 of the first embodiment. In the present embodiment, the providing request processor 203 and the denying node list generator 211 constitute prohibiting unit.

In cases where the second distributed data providing request is received, if the distributed data associated with the second data ID included in the received second distributed data providing request is not retained in the distributed data memory 202, the non-retaining notification processor 209 transmits a non-retaining notification to the other storing nodes 200, and stores the same non-retaining notification in the non-retaining notification memory 210 in association with the time point of transmitting the non-retaining notification.

The non-retaining includes sender identification information that identifies the information processing apparatus 10 that is the sender of the second distributed data providing request, a one-time ID and generating time point information included in the second data ID included in the second distributed data providing request, and the transmitting time point information representing the time point of transmitting the non-retaining notification. In the present embodiment, the sender identification information is an IP address. Alternatively, the non-retaining notification may include a hash value returned by a predetermined hash function on the one-time ID in place of the one-time ID or may include a digital signature of an information processing apparatus 10-p that transmits the non-retaining notification.

If the information processing apparatus 10-p is functioning a storing node 200, the non-retaining notification processor 209 receives non-retaining notification transmitted from another information processing apparatus 10-q, and stores the received non-retaining notification into the non-retaining notification memory 210 in association with the time point of receiving the non-retaining notification. Accordingly, the non-retaining notification memory 210 retains a non-retaining notification in association with the time point of receiving the non-retaining notification.

The non-retaining notification retained in the non-retaining notification memory 210 of the storing node 200 may be shared by at least one of the remaining storing nodes 200. The sharing of a non-retaining notification may be achieved by means of a technique called block chain. In cases where non-retaining notification is shared by multiple storing nodes 200, the transmitting destination of the non-retaining notification from the non-retaining notification processor 209 may be selected from among the multiple storing nodes 200 sharing the same non-retaining notification.

In cases where the information processing apparatus 10-p is functioning as a storing node 200, the denying node list generator 211 generates a denying node list on the basis of the non-retaining notification retained in the non-retaining notification memory 210 each time a predetermined generating period elapses, and causes the denying node list memory 212 to store therein the generated denying node list. Consequently, the denying node list memory 212 retains the denial node list.

The denying node list is information representing one or more information processing apparatuses 10 that are prohibited from being provided with the provided data from the storing nodes 200 in response to the second distributed data providing request among P information processing apparatuses 10-1, . . . , 10-P. In the present embodiment, the denying node list includes an IP address that each information processing apparatus 10 that is prohibited from providing the provided data has.

In the present embodiment, the denying node list is generated in the following manner.

The denying node list generator 211 obtains, for each piece of the sender identification information, the number of non-retaining notifications that are common in the generating time point information but different in the one-time IDs and that have the time points represented by the transmitting time point information is with a predetermined determination period from among the non-retaining notification retained in the non-retaining notification memory 210. In the present embodiment, the determination time period is a time period between the current time and a time point before the predetermined determination time from the current time.

The denying node list generator 211 generates a denying node list includes sender identification information from which a predetermined number or more non-retaining notifications are obtained. Thereby, a denying node list is generated.

The denying node list retained in the denying node list memory 212 may be shared by at least one of the remaining storing node list 200. The sharing of the denying node list may be achieved by means of a technique called block chain.

If the second distributed data providing request is received, the providing request processor 203 determines whether the sender identification information that identifies the user node 100 being the sender of the same second distributed data providing request is listed in the denying node list obtained by the storing node list request processor 208.

If the sender identification information that identifies the user node 100 being the sender of the same second distributed data providing request is listed in the denying node list, the providing request processor 203 transmits dummy data to the user node 100 that is the sender of the second distributed data providing request. The transmission of dummy data is an example of prohibiting providing of the distributed data. The providing request processor 203 may transmit no data to the user node 100 that is the sender of the second distributed data providing request.

In contrast, if the sender identification information that identifies the user node 100 being the sender of the same second distributed data providing request is not listed in the denying node list, the providing request processor 203 transmits the distributed data retained in the distributed data memory 202 in association with the second data ID included in the second distributed data providing request to the user node 100 that is the sender of the same second distributed data providing request.

Also if the first distributed data providing request is received, the providing request processor 203 may prohibit, on the basis of the denying node list, providing of the distributed data likewise the case where the second distributed data providing request is received.

Next, description will now be made in relation to the operation of the information processing system 1 of the third embodiment.

A storing node 10-w carries out the process of the flow diagram FIG. 10 in the following manner. Here, the symbol w is an integer of from two to P.

Figure 10:
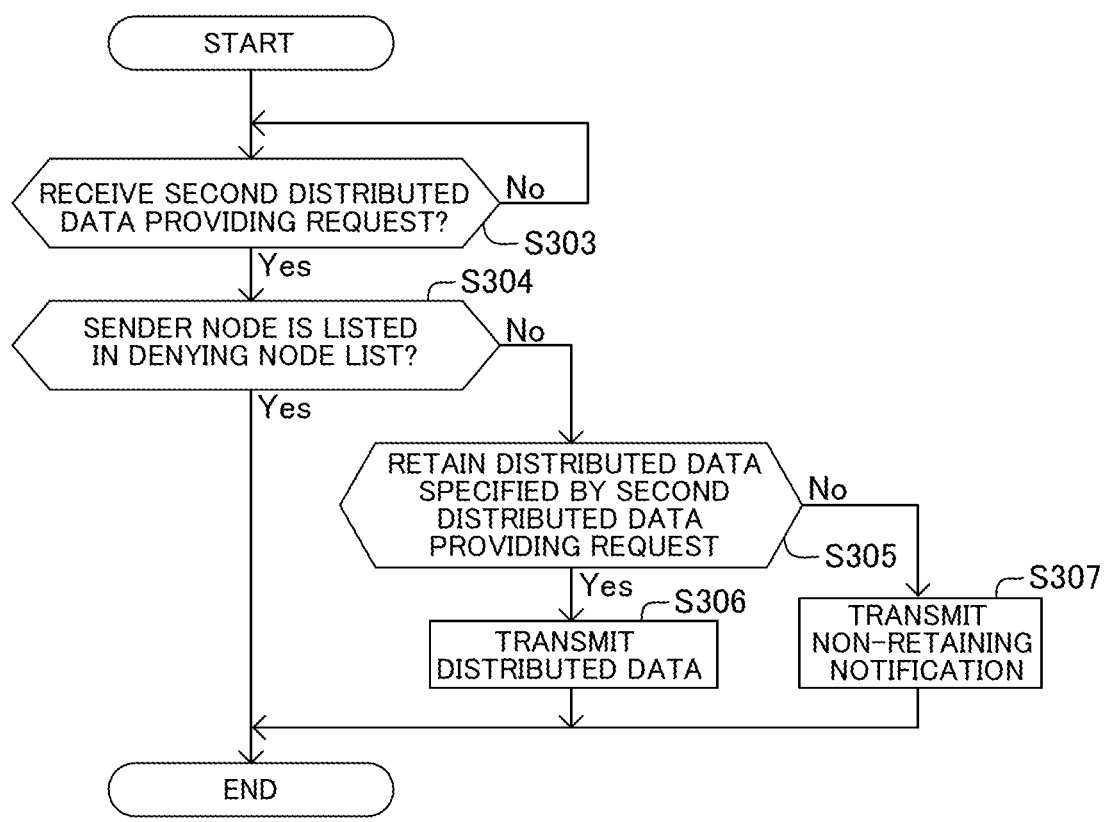
FIG. 10 is a flow diagram illustrating a process that an information processing apparatus according to the third embodiment carries out to provide distributed data.

The storing node 10-w stands by until receiving a second distributed data providing request from the user node 10-1 ("No" route in Step S303 of FIG. 10).

When a second distributed data providing request is received from the user node 10-1, the storing node 10-w makes a "Yes" determination and determines whether the sender node is listed in the denying node list retained therein (Step S304 of FIG. 10). The sender node corresponds to the sender of the second distributed data providing request, and is the user node 100 in the present embodiment.

If the sender node is listed in the denying node list, the storing node 10-w makes a "Yes" determination and finishes the process of FIG. 10 without transmitting the distributed data or a non-retaining notification.

If the sender node is not listed in the denying node list, the storing node 10-w makes a "No" determination, and determines whether the distributed data associated with the second data ID included in the second distributed data providing request received in Step S303 of FIG. 10 is retained in the corresponding memory device 12 (Step S305 of FIG. 10).

If the distributed data associated with the second data ID included in the second distributed data providing request is retained in the memory device 12, the storing node 10-w makes a "Yes" determination and transmits the provided data being the distributed data to the user node 10-1 that is the sender of the second distributed data providing request (Step S306 of FIG. 10). Then the storing node 10-w finishes the process of FIG. 10.

In contrast, if the distributed data associated with the second data ID included in the second distributed data providing request is not retained in the memory device 12, the storing node 10-w makes a "No" determination and transmits a non-retaining notification to the other storing nodes 200 (Step S307 of FIG. 10).

The non-retaining notification includes sender identification information that identifies the user node 10-1 being the sender of the second distributed data providing request, a one-time ID and generating time point information that are included in the second data ID included in the second distributed data providing request, and transmitting time point information representing the current time point as the time point at which the non-retaining notification is transmitted.

Then the storing node 10-w finishes the process of FIG. 10.

As described above, the information processing system 1 of the third embodiment brings the same advantages and effects as those of the first embodiment.

Furthermore, in the information processing system 1 of the third embodiment, the distributed data generated from the metadata is requested by the user node 100 transmitting a second distributed data providing request including a one-time ID and the generating time point information to a storing node 200.

In addition, if the user node 100 transmits a predetermined number or more of second distributed data providing requests common in generating time point information but different in one-time ID are transmitted within the predetermined determination time period, the information processing system 1 prohibits providing of the provided data in response to the request from the user node 100.

In cases where a user requesting to store the secret data requests to restore the secret data, multiple second distributed data providing requests that are common in generating time point information but different in one-time ID are seldom transmitted. Accordingly, in cases where many second distributed data providing requests that are common in generating time point information but different in one-time ID are transmitted, there is a high possibility that a user different from the user requesting to store the secret data is attempting in unscrupulously obtaining the secret data.

As a solution to the above, in cases where a predetermined number or more of second distributed data providing requests that are common in generating time point information but different in one-time ID are transmitted within a predetermined determination time period, the information processing system 1 prohibits providing of the provided data in response to the request from the user. This can inhibit unscrupulously obtaining of the secret data.

Alternatively, each storing node 200 may use only the denying node list that the storing node 200 itself generates without using denying node lists that other storing nodes 200 generate. This can appropriately suppress attacks of Denial of Service (DoS) made by a wrong denying node list.

The denying node list generator 211 may limit pieces of sender identification information to be included in the denying node list to pieces of sender identification information wherein the number of storing nodes 200 that are the senders of non-retaining notifications of equal to or more than a predetermined threshold node number (e.g., more than the half the total number of storing nodes 200) among pieces of sender identification information having the obtained non-retaining notifications equal to or more than the threshold. This can appropriately suppress attacks of Denial of Service (DoS) made by a wrong denying node list.

The denying node list generator 211 may limit pieces of sender identification information to be included in the denying node list to pieces of sender identification information each in which an unscrupulous access to the own node is detected among pieces of sender identification information having the obtained non-retaining notifications equal to or more than the threshold. This can appropriately suppress attacks of Denial of Service (DoS) made by a wrong denying node list.

<First Modification to Third Embodiment>

Next, description will now be made in relation to an information processing system according to a first modification to the third embodiment. The information processing system of the first modification to the third embodiment is different from that of the third embodiment in information to be used as the one-time ID. Hereinafter, the description focuses on the difference. Like reference number designate the same or the substantially same reference parts and elements between the third embodiment and the first modification to the third embodiment.

In this modification, the one-time ID included in the second data ID is different information with each of the N storing nodes 200 included in the node group for the second distributed data group likewise the fourth modification to the first embodiment. In the present embodiment, the one-time IDs constitute generating information generated on the basis of the input information.

In this modification, the one-time ID for the n-th storing node 200 among the N storing nodes 200 included in the node group for the second distributed data group is a hash value returned by a predetermined hash function on the information obtained by adding the node ID that identifies the r-th storing node 200 among the N storing nodes 200 to the user ID included in the input information. The symbol "r" represents the number n+1 when the symbol n represents integers of one to N−1, and represents one when the symbol n represents N. Examples of the hash function are MD5, SHA-0, SHA-1, SHA-2, and SHA-3.

As described above, the information processing system 1 of the first modification to the third embodiment brings the same advantages and effects as those of the third embodiment.

Furthermore, the information processing system 1 of the first modification to the third embodiment generates, as identification information, information different with each of the N memory devices 12 included in the selected node group.

This can reduce the possibility that the distributed data to be used to restore the secret data is specified on the basis of the identification information.

Alternatively, the one-time ID of the n-th storing node among the N storing nodes 200 may be the remainder of the division returned by a Hash value of the above hash function on the information obtained by adding the node ID to specify the r-th storing node 200 among the N storing nodes to the user ID included in the input information by a first parameter, which is a positive integer. The first parameter in the present modification is predetermined in the information processing system 1. Using the first parameter can further reduce the possibility that the information based on which the one-time ID is generated can be specified.

Alternatively, the first parameter may fluctuate. In this alternative, the first parameter may be set to increase as the number of node IDs listed in the storing node list increases. In this case, a first parameter function that defines the relationship between the number of node IDs listed in the storing node list and the first parameter is defined in the information processing system 1 in advance, for example.

<Second Modification to Third Embodiment>

Next, description will now be made in relation to an information processing system according to a second modification to the third embodiment. The information processing system of the second modification to the third embodiment is different from that of the first modification to the second embodiment in the point that second data ID includes the hash value of the generating time point information in place of the generating time point information. Hereinafter, the description focuses on the difference. Like reference number designate the same or the substantially same reference parts and elements between the first modification to the third embodiment and the second modification to the third embodiment.

In the present modification, the second data ID includes the generating time point specification information in place of the generating time point information. In the present modification, the generating time point specification information is a hash value returned by a predetermined hash function on the generating time point information. In the present modification, the generating time point specification information constitute time point specification information that specifies a time point. Examples of the hash function are MD5, SHA-0, SHA-1, SHA-2, and SHA-3.

As described above, the information processing system 1 of the second modification to the third embodiment brings the same advantages and effects as those of the first modification to the third embodiment.

Furthermore, the information processing system 1 of the second modification to the third embodiment can reduce the possibility that the time point of generating a list is specified.

Alternatively, the generating time point specification information may be the remainder of the division of the hash value returned by the predetermined hash function on the generating time point information by a second parameter, which is a positive integer. The second parameter in the present modification is predetermined in the information processing system 1. This can reduce the possibility that the time point of generating a list is specified.

Alternatively, the second parameter may fluctuate. In this alternative, the second parameter may be set to increase as the number of storing node list candidates from which the storing node list is selected, the number of storing node list candidates generated in a predetermined time period, or the number of information processing apparatuses functioning as the storing nodes 200 increase.

In this case, a second parameter function that defines the relationship between the second parameter and one of as the number of storing node list candidates from which the storing node list is selected, the number of storing node list candidates generated in a predetermined time period, and the number of information processing apparatuses functioning as the storing nodes 200 is defined in the information processing system 1 in advance, for example.

In the foregoing embodiments, a technique to change the storing destinations of distributed data as the time point of storing data changes is applied to metadata. Alternatively, the technique may be applied to data (e.g., user data) different from metadata.

In the foregoing embodiments, the information processing system 1 carries out communication in conformity with a Peer 2 Peer (P2P) scheme. Alternatively, the information processing system 1 may carry out communication in conformity with a different scheme (e.g., the client-server scheme) from the P2P scheme.

It is possible to abate the load on a process to specify storing destinations of the distributed data to be used for restoring secret data, inhibiting the secret data from being unscrupulously obtained.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, alterations, and combination of the above embodiments and modifications thereof could be made hereto without departing from the spirit and scope of the invention.

What is claimed is:

1. An information processing system comprising:
M (M represents an integer of two or more) memory devices;
a processor configured to:
generate N (N represents an integer of two or more and M or less) pieces of distributed data from secret data in accordance with a secret sharing scheme;
select one node group associated with a time point included in a time period between a current time point and a time point before a predetermined time from the current time point among a plurality of node groups each being associated with one of a plurality of time points and each including C (C is an integer of N or more and M or less) memory devices selected from the M memory devices, and store the N pieces of distributed data one to each of N memory devices included in the selected node group; and
carry out a restoring process on a first node group among the plurality of node groups,
the restoring process comprising:
requesting at least one of N memory devices included in the first node group for the distributed data;
restoring the secret data from a provided data provided in response to the requesting in accordance with the secret sharing scheme; and
if the restoring results in failure, carrying out the restoring process on a second node group associated with a time point before a time point associated with the first node group that causes the failure among the plurality of node groups.

2. The information processing system according to claim 1, wherein the processor is further configured to:
receive a storing request in association with input information input from a user, and if the storing request is received, sets the plurality of node groups on the basis of the input information associated with the storing request; and
receive a restoring request in association with input information input from a user, and if the restoring request is received, sets the plurality of node groups on the basis of the input information associated with the restoring request.

3. The information processing system according to claim 1, wherein:
the plurality of node groups are set on the basis of a plurality of pieces of device rank information each associated with one of the plurality of time points and a predetermined information rank relationship between the input information and C different ranks, and
the device rank information represents at least one of the M memory devices and a rank provided to the at least one memory device.

4. The information processing system according to claim 1, wherein:
the plurality of node groups are set on the basis of device rank information representing at least one of the M memory devices and a rank provided to the at least one memory device and information rank relationships each associated with one of the plurality of time points; and the information rank relationship is a predetermined relationship between the input information and C different ranks.

5. The information processing system according to claim 1, wherein the secret data includes information representing a plurality of memory devices each storing one of a plurality of pieces of distributed data generated from secret data different from the secret data in accordance with the secret sharing scheme.

6. The information processing system according to claim 1, wherein the processor further configured to receive time period information representing a time period and being input from a user, and limit a group node that is to undergo the restoring process to one or more node groups associated with time points within the time period represented by the time period information among the plurality of node groups.

7. The information processing system according to claim 1, wherein the processor further configured to generate identification information on the basis of the time point associated with the selected node group, and store each of the N pieces of distributed data in association with the generated identification information.

8. The information processing system according to claim 7, wherein the processor further configured to generate, as the identification information, information different with each of N memory devices included in the selected node group.

9. The information processing system according to claim 1, wherein:
the number C of memory devices included in the node group is set to be larger as a password used for authenticating a user is more easily specified;
the processor further configured to randomly select N memory devices from among the C memory devices included in the selected node group and stores the N generated pieces of distributed data each into one of the N selected memory devices; and
the restoring process comprises requesting C memory devices included in the first node group for the distributed data, and restoring the secret data from each of one or more combinations of N pieces of provided data selected from C pieces of provided data provided in response to the requesting in accordance with the secret sharing scheme.

10. The information processing system according to claim 1, wherein:
the requesting for the distributed data to the memory device is made by an information processing apparatus transmitting a providing request including time point specification information that specifies a time point and one of input information input from the user or generated information generated based on the input information to the memory device; and
the processor further configured to
prohibit, if the information processing apparatus transmits a predetermined number or more of the providing requests common in the time point specification information and different in the input information or the generating information within a predetermined determination time period, providing of the providing data in response to the request from the information processing apparatus.

11. An information processing apparatus communicably connected to M (M represents an integer of two or more) memory devices, the information processing apparatus comprising a processor configured to:

generate N (N represents an integer of two or more and M or less) pieces of distributed data from secret data in accordance with a secret sharing scheme;

select one node group associated with a time point included in a time period between a current time point and a time point before a predetermined time from the current time point among a plurality of node groups each being associated with one of a plurality of time points and each including C (C is an integer of N or more and M or less) memory devices selected from the M memory devices, and store the N pieces of distributed data one to each of N memory devices included in the selected node group; and carry out a restoring process on a first node group among the plurality of node groups, the restoring process comprising:

requesting at least one of N memory devices included in the first node group for the distributed data;

restoring the secret data from a provided data provided in response to the requesting in accordance with the secret sharing scheme; and if the restoring results in failure, carrying out the restoring process on a second node group associated with a time point before a time point associated with the first node group that causes the failure among the plurality of node groups.

12. A method for information processing using M (M represents an integer of two or more) memory devices, the method comprising:

generating N (N represents an integer of two or more and M or less) pieces of distributed data from secret data in accordance with a secret sharing scheme;

selecting one node group associated with a time point included in a time period between a current time point and a time point before a predetermined time from the current time point among a plurality of node groups each being associated with one of a plurality of time points and each including C (C is an integer of N or more and M or less) memory devices selected from the M memory devices, and storing the N pieces of distributed data one to each of N memory devices included in the selected node group; and carrying out a restoring process on a first node group among the plurality of node groups, the restoring process comprising:

requesting at least one of N memory devices included in the first node group for the distributed data;

restoring the secret data from a provided data provided in response to the requesting in accordance with the secret sharing scheme; and if the restoring results in failure, carrying out the restoring process on a second node group associated with a time point before a time point associated with the first node group that causes the failure among the plurality of node groups.

13. A non-transitory computer-readable recording medium having stored therein an information processing program that causes an information processing apparatus communicably connected to M (M represents an integer of two or more) memory devices to execute a process comprising:

generating N (N represents an integer of two or more and M or less) pieces of distributed data from secret data in accordance with a secret sharing scheme;

selecting one node group associated with a time point included in a time period between a current time point and a time point before a predetermined time from the current time point among a plurality of node groups each being associated with one of a plurality of time points and each including C (C is an integer of N or more and M or less) memory devices selected from the M memory devices, and storing the N pieces of distributed data one to each of N memory devices included in the selected node group; and carrying out a restoring process on a first node group among the plurality of node groups, the restoring process comprising:

requesting at least one of N memory devices included in the first node group for the distributed data;

restoring the secret data provided in response to the requesting in accordance with the secret sharing scheme; and if the restoring results in failure, carrying out the restoring process on a second node group associated with a time point before a time point associated with the first node group that causes the failure among the plurality of node groups.

* * * * *